US009246793B2

(12) United States Patent
Inaba

(10) Patent No.: US 9,246,793 B2
(45) Date of Patent: *Jan. 26, 2016

(54) NETWORK, NETWORK FAULT RECOVERY METHOD, AND NODE DEVICE

(75) Inventor: Toru Inaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 627 days.

This patent is subject to a terminal disclaimer.

(21) Appl. No.: 13/424,726

(22) Filed: Mar. 20, 2012

(65) Prior Publication Data

US 2012/0287776 A1    Nov. 15, 2012

(30) Foreign Application Priority Data

May 11, 2011  (JP) .................................. 2011-106650

(51) Int. Cl.
*G01R 31/08*     (2006.01)
*H04L 12/761*    (2013.01)
*H04L 12/707*    (2013.01)
*H04L 12/703*    (2013.01)
*H04L 12/723*    (2013.01)
*H04L 12/26*     (2006.01)

(52) U.S. Cl.
CPC ................ *H04L 45/16* (2013.01); *H04L 45/22* (2013.01); *H04L 45/28* (2013.01); *H04L 45/50* (2013.01); *H04L 43/10* (2013.01)

(58) Field of Classification Search
CPC .................................................... H04W 28/04
See application file for complete search history.

(56) References Cited

U.S. PATENT DOCUMENTS

| 6,912,196 | B1* | 6/2005 | Mahalingaiah | ....... H04L 12/437 |
| | | | | 370/216 |
| 2003/0179702 | A1* | 9/2003 | Chi et al. | ....................... 370/218 |
| 2005/0201273 | A1* | 9/2005 | Shimizu | ......................... 370/216 |
| 2005/0249233 | A1 | 11/2005 | Akaba et al. | |
| 2007/0242604 | A1* | 10/2007 | Takase et al. | .................. 370/223 |
| 2008/0068988 | A1* | 3/2008 | Tochio | .......................... 370/228 |

FOREIGN PATENT DOCUMENTS

| JP | 2007-053484 | 3/2007 |
| JP | 2007-282153 | 10/2007 |
| JP | 2010-515314 | 5/2010 |
| WO | WO-2004-064335 | 7/2004 |
| WO | WO-2008-080418 | 7/2008 |

* cited by examiner

*Primary Examiner* — Samina Choudhry
(74) *Attorney, Agent, or Firm* — Fujitsu Patent Center

(57) ABSTRACT

A ring network of a multicast label switch path scheme includes a plurality of nodes connected to form a ring. Further, a signal input to a first one of the nodes is branched to be transmitted in first and second different directions to a second and a third one of the nodes through a first working path and a second working path, respectively, in the ring network, the second one and the third one of the nodes defining end points of the first working path and the second working path, respectively, from the first one of the nodes, and a first backup path is set from the second one of the nodes to the first one of the nodes in the first direction, and a second back up path is set from the third one of the nodes to the first one of the nodes in the second direction.

3 Claims, 29 Drawing Sheets

FIG.7

| NODE NAME | GROUP ID | TYPE | DIRECTION | RECEIVING LINE | RECEIVING LABEL | TRANSMISSION LINE | TRANSMISSION LABEL | TRANSMISSION PRI | REMARKS |
|---|---|---|---|---|---|---|---|---|---|
| N1 | 10 | A | A | N1-3 | — | N1-1 | 11 | 3 | Server-N1-A |
|  | 10 | X | A | N1-2 | 18 | — | — | — | PACKET OTHER THAN OAM IS DESTROYED |
|  | 10 | A | B | N1-3 | — | N1-2 | 21 | 3 |  |
|  | 10 | X | B | N1-1 | 22 | — | — | — | PACKET OTHER THAN OAM IS DESTROYED |
| N2 | 20 | T | A | N2-2 | 11 | N2-1 | 12 | 255 | Client-N2-A |
|  | 20 | D | A | N2-2 | 11 | N2-3 | — | 255 |  |
|  | 20 | T | B | N2-1 | 23 | N2-2 | 22 | 255 |  |
| N3 | 30 | T | A | N3-2 | 12 | N3-1 | 13 | 255 |  |
|  | 30 | T | B | N3-1 | 24 | N3-2 | 23 | 255 |  |
| N4 | 40 | T | A | N4-2 | 13 | N4-1 | 14 | 255 | Client-N4-A |
|  | 40 | D | A | N4-2 | 13 | N4-3 | — | 255 |  |
|  | 40 | T | B | N4-1 | 25 | N4-2 | 24 | 255 |  |
| N5 | 50 | T | A | N5-2 | 14 | N5-1 | 15 | 0 | Client-N5-A |
|  | 50 | D | A | N5-2 | 14 | N5-3 | — | 255 |  |
|  | 50 | T | B | N5-1 | 26 | N5-2 | 25 | 255 |  |
| N6 | 60 | T | A | N6-2 | 15 | N6-1 | 16 | 255 |  |
|  | 60 | T | B | N6-1 | 27 | N6-2 | 26 | 255 |  |
| N7 | 70 | T | A | N7-2 | 16 | N7-1 | 17 | 0 | Client-N7-A |
|  | 70 | T | B | N7-1 | 28 | N7-2 | 27 | 255 |  |
|  | 70 | D | B | N7-1 | 28 | N7-3 | — | 255 |  |
| N8 | 80 | T | A | N8-2 | 17 | N8-1 | 18 | 255 |  |
|  | 80 | T | B | N8-1 | 21 | N8-2 | 28 | 255 | Client-N8-A |
|  | 80 | D | B | N8-1 | 21 | N8-3 | — | 255 |  |

FIG.8

| NODE NAME | MONITORING STATE | MONITORING TIME | DIRECTION | RECEIVING LINE | RECEIVING LABEL | REMARKS |
|---|---|---|---|---|---|---|
| N1 | — | — | — | — | — | NO MEP SET |
| N2 | — | — | — | — | — | NO MEP SET |
| N3 | — | — | — | — | — | NO MEP SET |
| N4 | — | — | — | — | — | NO MEP SET |
| N5 | OK | 100ms | A | N5-2 | 14 | |
| N6 | — | — | — | — | — | NO MEP SET |
| N7 | OK | 100ms | B | N7-1 | 28 | |
| N8 | — | — | — | — | — | NO MEP SET |

FIG.9

| NODE NAME | RECEIVING SOURCE SETTING | | SETTING WHEN NO FAILURE | | | SETTING DURING FAILURE | | | REMARKS |
|---|---|---|---|---|---|---|---|---|---|
| | | | TRANSMISSION DESTINATION SETTING | | | TRANSMISSION DESTINATION SETTING | | | |
| | LINE | LABEL | LINE | LABEL | PRI | LINE | LABEL | PRI | |
| N1 | N1-3 | — | N1-1 | 11 | 3 | — | — | — | ADD LSP |
| | N1-2 | 18 | — | — | — | — | — | — | PACKET OTHER THAN OAM IS DESTROYED DUE TO ADD NODE |
| | N1-3 | — | N1-2 | 21 | 3 | — | — | — | ADD LSP |
| | N1-1 | 22 | — | — | — | — | — | — | PACKET OTHER THAN OAM IS DESTROYED DUE TO ADD NODE |
| N2 | N2-2 | 11 | N2-1 | 12 | 255 | — | — | — | THR LSP |
| | N2-2 | 11 | N2-3 | — | 255 | — | — | — | DROP LSP |
| | N2-1 | 23 | N2-2 | 22 | 255 | N2-2 | 11 | 3 | |
| N3 | N3-2 | 12 | N3-1 | 13 | 255 | — | — | — | THR LSP |
| | N3-1 | 24 | N3-2 | 23 | 255 | N3-2 | 12 | 3 | |
| N4 | N4-2 | 13 | N4-1 | 14 | 255 | — | — | — | THR LSP |
| | N4-2 | 13 | N4-3 | — | 255 | — | — | — | DROP LSP |
| | N4-1 | 25 | N4-2 | 24 | 255 | N4-2 | 13 | 3 | |
| N5 | N5-2 | 14 | N5-1 | 15 | 0 | — | — | — | THR LSP (TRANSFER FROM CURRENTLY-USED LSP TO BACKUP LSP) |
| | N5-2 | 14 | N5-3 | — | 255 | — | — | — | DROP LSP |
| | N5-1 | 26 | N5-2 | 25 | 255 | N5-2 | 14 | 3 | |
| N6 | N6-2 | 15 | N6-1 | 16 | 255 | — | — | — | |
| | N6-1 | 27 | N6-2 | 26 | 255 | — | — | — | |
| N7 | N7-2 | 16 | N7-1 | 17 | 255 | — | — | — | |
| | N7-1 | 28 | N7-2 | 27 | 0 | N7-1 | 28 | 3 | THR LSP (TRANSFER FROM CURRENTLY-USED LSP TO BACKUP LSP) |
| | N7-1 | 28 | N7-3 | — | 0 | — | — | — | DROP LSP |
| N8 | N8-2 | 17 | N8-1 | 18 | 255 | — | — | — | THR LSP |
| | N8-1 | 21 | N8-2 | 28 | 255 | N8-1 | 21 | 3 | |
| | N8-1 | 21 | N8-3 | — | 255 | — | — | — | DROP LSP |

FIG.11A

| FIELD NAME | DESCRIPTION | REMARKS |
|---|---|---|
| Type | 0x40 | 1 byte |
| Length | 0x01 | 2 byte |
| DIRECTION | 0x01: A DIRECTION, 0x02: B DIRECTION | 1 byte |
| LOC-F | 0x00: NOT OCCURRED, 0x01: BING OCCURRED | 1 byte |

FIG.11B

| FIELD NAME | DESCRIPTION | REMARKS |
|---|---|---|
| Type | 0x41 | 1 byte |
| Length | 0x01 | 2 byte |
| DIRECTION | 0x01: A DIRECTION, 0x02: B DIRECTION | 1 byte |
| THR-REQ | 0x00: RELEASE, 0x01: SET | 1 byte |

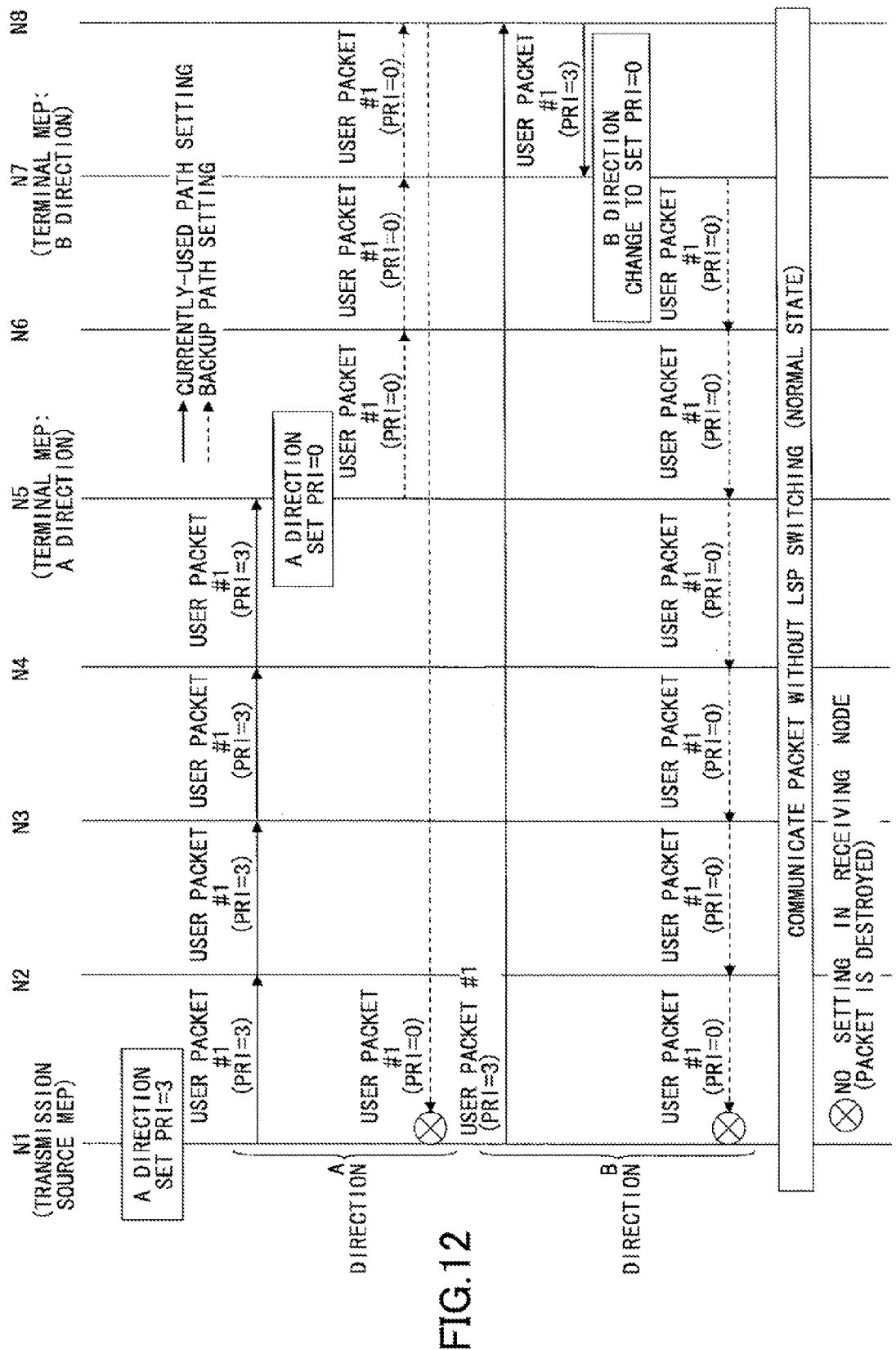

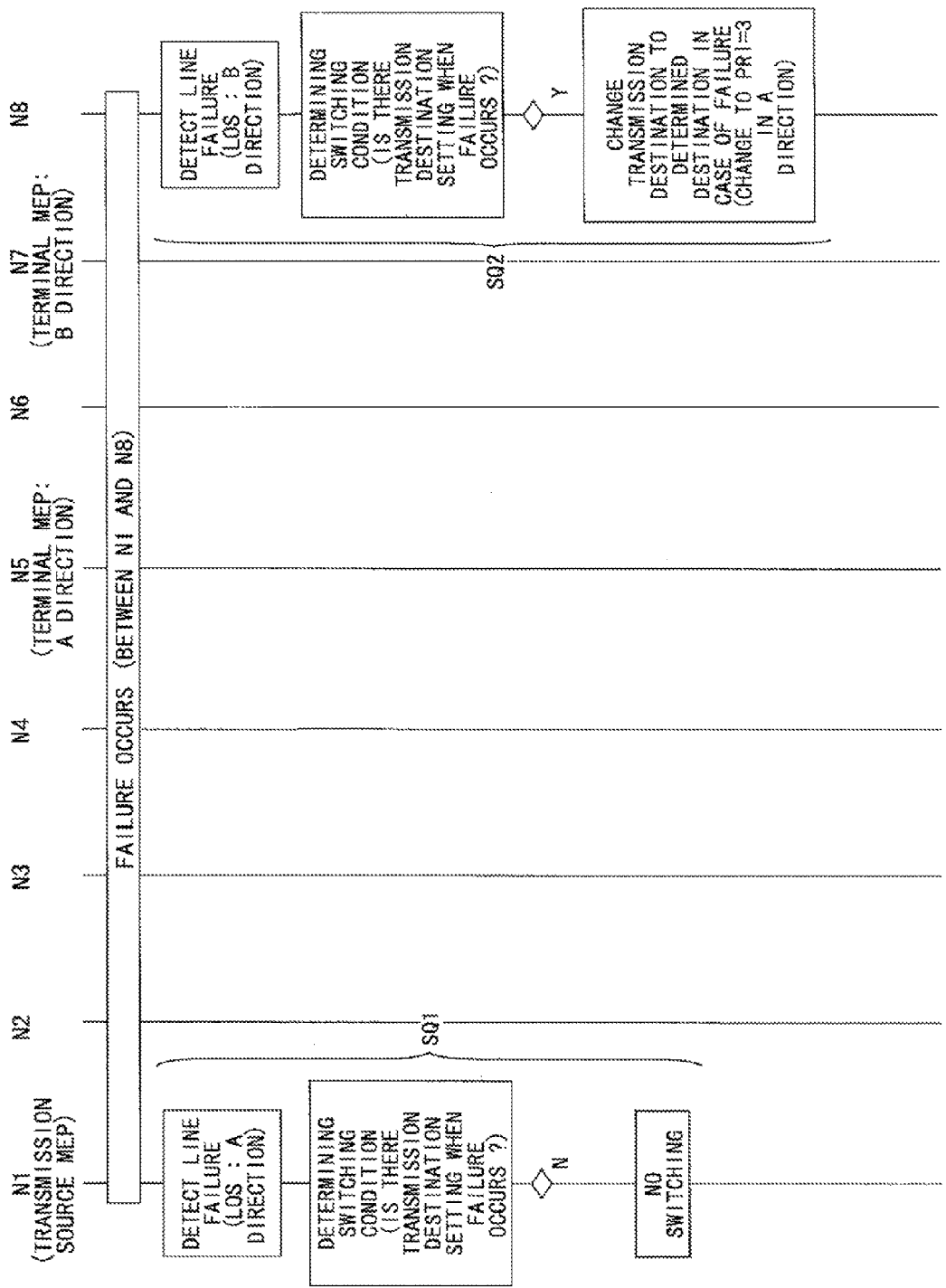

FIG.16

| NODE NAME | RECEIVING SOURCE SETTING | SETTING WHEN NO FAILURE | | | SETTING DURING FAILURE | | | REMARKS |
|---|---|---|---|---|---|---|---|---|
| | | TRANSMISSION DESTINATION SETTING | | | TRANSMISSION DESTINATION SETTING | | | |
| | LINE LABEL | LINE | LABEL | PRI | LINE | LABEL | PRI | |
| N1 | N1-3 | N1-1 | 11 | 3 | --- | --- | --- | ADD LSP |
| | N1-2 | 18 | --- | --- | --- | --- | --- | PACKET OTHER THAN OAM IS DESTROYED DUE TO ADD NODE |
| | N1-3 | N1-2 | 21 | 3 | --- | --- | --- | ADD LSP |
| | N1-1 | 22 | --- | --- | --- | --- | --- | PACKET OTHER THAN OAM IS DESTROYED DUE TO ADD NODE |
| N2 | N2-2 | N2-1 | 12 | 255 | --- | --- | --- | THR LSP |
| | N2-2 | N2-3 | --- | 255 | --- | --- | --- | DROP LSP |
| | N2-1 | 23 | N2-2 | 22 | 255 | N2-2 | 11 | 3 | |
| N3 | N3-2 | N3-1 | 13 | 255 | --- | --- | --- | THR LSP |
| | N3-1 | 24 | N3-2 | 23 | 255 | N3-2 | 12 | 3 | |
| N4 | N4-2 | N4-1 | 14 | 255 | --- | --- | --- | THR LSP |
| | N4-2 | N4-3 | --- | 255 | --- | --- | --- | DROP LSP |
| | N4-1 | 25 | N4-2 | 24 | 255 | N4-2 | 13 | 3 | |
| N5 | N5-2 | 14 | N5-1 | 15 | 0 / 7 | --- | --- | --- | THR LSP (TRANSFER FROM CURRENTLY-USED LSP TO BACKUP LSP) |
| | N5-1 | 26 | N5-3 | --- | 255 | --- | --- | --- | DROP LSP |
| | N5-1 | 26 | N5-2 | 25 | 255 | N5-2 | 14 | 3 | |
| N6 | N6-2 | 15 | N6-1 | 16 | 255 | --- | --- | --- | |
| | N6-1 | 27 | N6-2 | 26 | 255 | --- | --- | --- | |
| N7 | N7-2 | 16 | N7-1 | 17 | 255 | N7-1 | 28 | 3 | |
| | N7-1 | 28 | N7-2 | 27 | 0 | --- | --- | --- | THR LSP (TRANSFER FROM CURRENTLY-USED LSP TO BACKUP LSP) |
| N8 | N7-1 | 28 | N8-1 | 18 | 255 | --- | --- | --- | DROP LSP |
| | N8-2 | 17 | N8-1 | 18 | 255 | N8-1 | 21 | 3 | |
| | N8-1 | 21 | N8-2 | 28 | 255 | --- | --- | --- | THR LSP |
| | N8-1 | 21 | N8-3 | --- | 255 | --- | --- | --- | DROP LSP |

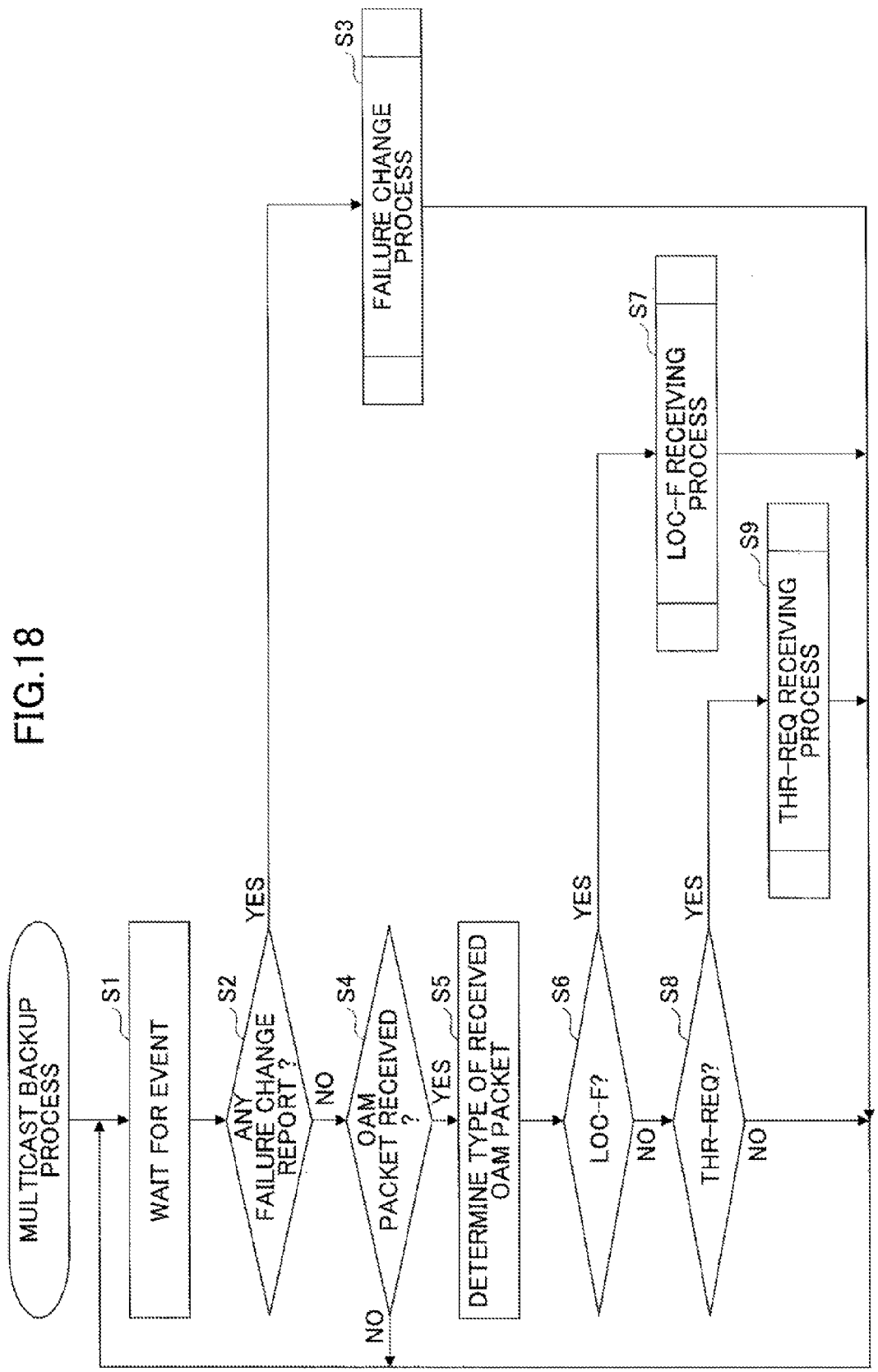

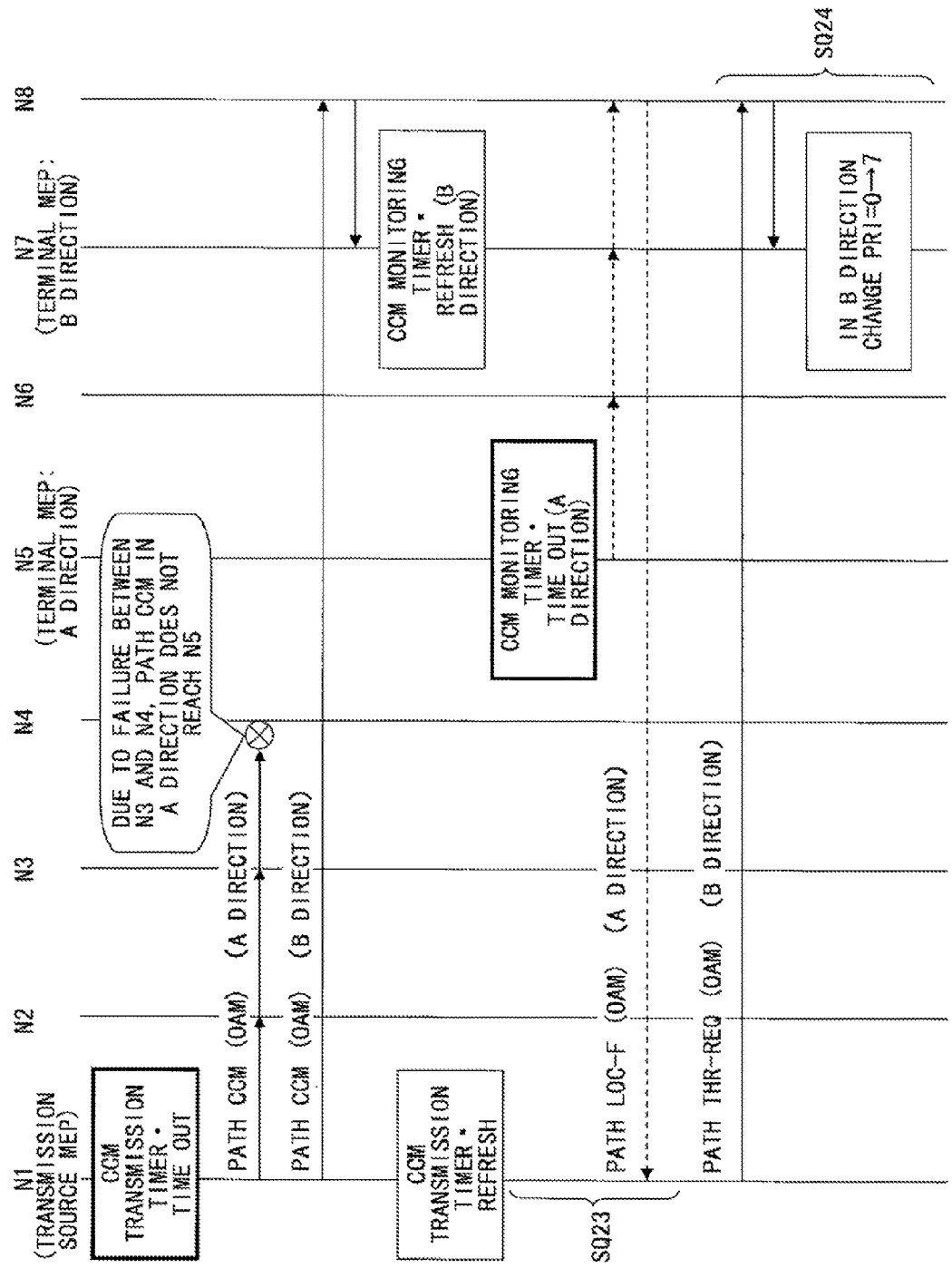

NETWORK, NETWORK FAULT RECOVERY METHOD, AND NODE DEVICE

CROSS-REFERENCE TO RELATED APPLICATION

This application is based upon and claims the benefit of priority of Japanese Patent Application No. 2011-106650, filed May 11, 2011, the entire contents of which are incorporated herein by reference.

FIELD

The embodiment discussed herein is related to a network, a fault recovery method, and a node device.

BACKGROUND

Recently, with the improvements of the Ethernet (registered trade mark) and IP technologies, use of IP in the network has been more and more popular. This trend has been popular among network providers, so that the replacement of an SDH (Synchronous Digital Hierarchy) transmission method by a packet transmission method has been started in order to improve the transmission efficiency to respond to an increasing demand of IP traffic of a carrier network and reduce a cost. A difference between the SDH transmission method and the packet transmission method is described below.

The SDH transmission method is a TDM (Time Division Multiplexing) based technology, which means time slots may be occupied (used) when there are no data to be transmitted. On the other hand, in the packet transmission method, when there are no data to be transmitted, another service may use the time slots; therefore the line (use) efficiency may be improved.

In a carrier network, from a viewpoint of operational management, even when a packet transmission method is used, it is required to conduct path management (i.e., static path setting). To fulfill this requirement, a method called an MPLS-TP (Multi Protocol Label Switching-Transport Profile) packet-based transport method has been developed.

FIG. 1 illustrates an example of a ring network employing the MPLS-TP scheme for conducting multicast communications. As illustrated in FIG. 1, nodes N1, N2, N3, N4, N5, N6, N7, and N8 are connected in a ring shape to form a ring network. In the ring network, an LSP#WA is set which is a working LSP (Label Switch Path) set along an "A" direction (clockwise direction) illustrated as a solid line between the node N1 and the node N5.

Also, an LSP#WB is set which is a working LSP (Label Switch Path) set along a "B" direction (counterclockwise direction) illustrated as a solid line between the node N1 and the node N7.

In this case, a signal added (inserted) at the node N1 is duplicated and branched into two. As a result, one of the branched signals is distributed (transmitted) from the node N1 to the nodes N2, N3, N4, and N5 in this order and dropped (extracted) at the nodes N2, N4, and N5. Similarly, the other of the branched signals is distributed from the node N1 to the nodes N8 and N7 in this order and dropped (extracted) at the nodes N8 and N7.

When a failure (typically, a loss of continuity) occurs in the ring network of FIG. 1, it is necessary to respond to the failure to make it possible to use the ring network (hereinafter may be referred to as "relieve" or "backup").

For example, to "relieve" the LSP#WA in the A direction (clockwise direction), an LSP#PB illustrated as the dotted line along the B direction (counterclockwise direction) is set. Also, to relieve the LSP#WB in the B direction (counterclockwise direction), an LSP#PA illustrated as the dotted line along the A direction (clockwise direction) is set.

Generally, by monitoring the reception of a CCM (Continuity Check Message) packet of an OAM (Operation Administration and Maintenance) packet which is a monitor/control packet of the working and backup (preliminary) LSP at nodes N5 and N7 at terminals points, a failure is relieved ("backuped") separately for each of the LSPs.

There has been known a technique in which in a ring-type network, in multicast communications, the entry information indicating the nodes relevant to the multicast communications is shared among the node transmitting data and the nodes receiving the data. Then, the transmitting node determines the transmission direction along which the multicast data are to be transmitted by referring the entry information and topology information, and, on the other hand, the receiving nodes discard (destroy) the multicast data when determining that there is no farther receiving node to received the multicast data beyond in the transmission direction (see, for example, International Publication Pamphlet No. WO2004/064335).

Further, there has been known a technique in which communications signals are transmitted from an ingress node to plural egress nodes along two or more paths on a network; a primary path through which a multicast communication signal is transmitted in advance along a communication link before a failure occurs in the network and a backup path through which the multicast communication signal is transmitted along a communication link are set; when a failure occurs a multicast communication signal is transmitted on the primary path and a copy of the multicast signal is transmitted on the backup path (see, for example, Japanese National Publication of International Patent Application No. 2010-515314).

Further, there has been known a technique in which a multi-point logical path is set in two systems (i.e., a working system and a backup system). The multi-point logical path is the path in which a frame transmitted from a transmission terminal node is not only transmitted to multicast frame receiving terminal nodes but also transmitted back to the transmission terminal node after transmitting along the ring so that the frame is terminated by the transmission terminal node as well. Then, a node detecting a failure transmits a forward failure report frame to the multicast (multi-point) logical path where the failure occurs, and the transmission terminal node receiving the forward failure report frame stops using the multicast (multi-point) logical path and transmits the frame by using a path that no forward failure report frame is received from yet (see, for example, Japanese Laid-open Patent Publication No. 2007-282153).

Further, there has been known a technique in which the transmission terminal node hierarchically divides the transmission frame into two, appends a header including plural addresses and the terminal No. of the terminal which becomes the end terminal, and separately transmits in both directions of the ring transmission path. By doing this, a multicast communication having higher confidentiality and band use efficiency in the ring transmission path is achieved (see, for example, Japanese Laid-open Patent Publication No. 2007-53484).

SUMMARY

According to an aspect of the present invention, a ring network of a multicast label switch path scheme includes a plurality of nodes connected to form a ring. Further, a signal input to a first one of the nodes is branched to be transmitted in first and second different directions to a second and a third one of the nodes through a first working path and a second working path, respectively, in the ring network, the second one and the third one of the nodes defining end points of the first working path and the second working path, respectively, from the first one of the nodes, and a first backup path is set from the second one of the nodes to the first one of the nodes in the first direction in the ring network, and a second back up path is set from the third one of the nodes to the first one of the nodes in the second direction in the ring network.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 7 is a table illustrating example LSP management information items according to the embodiment;

FIG. 8 is a table illustrating example path CCM monitor information items according to the embodiment;

FIG. 9 is a table illustrating example transmission receiving label control information items according to the embodiment;

FIGS. 11A and 11B illustrate example TLV formats of LOC-F and THR-REQ, respectively;

FIG. 12 is a sequence diagram illustrating an example operational sequence in a normal state;

FIGS. 15A and 15B illustrate example operational sequences when a line failure occurs;

FIG. 16 is a table illustrating an example of changed transmission receiving label control information items;

FIG. 18 is an example flowchart of a process according to the embodiment and executed by each node;

FIGS. 25A, 25B, and 25C illustrate example operational sequences when a line failure occurs.

DESCRIPTION OF EMBODIMENTS

Figure 1:
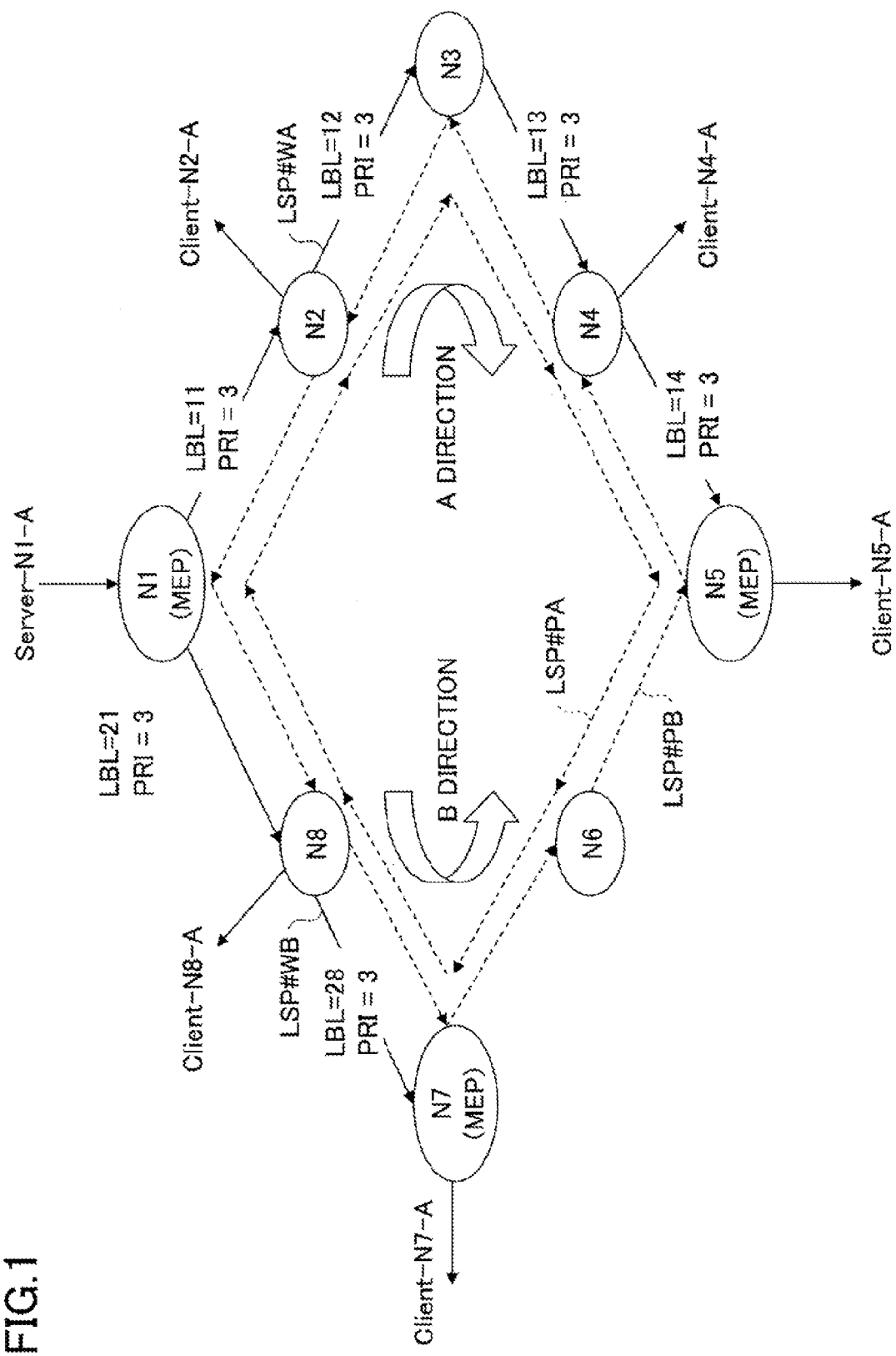
FIG. 1 illustrates an example configuration of a ring network.

In the case of FIG. 1, to backup (relieve) the working LSP#WA in the A direction, it may be necessary to provide the LSP#PB in the B direction. Also, to backup (relieve) the working LSP#WB in the B direction, it may be necessary to provide the LSP#PA in the B direction. By doing this, however, it may be necessary to separately designate labels for each of the links included in the backup paths LSP#PA and LSP#PB when those backup paths established. As a result, many label values may have to be consumed (used).

Figure 2:
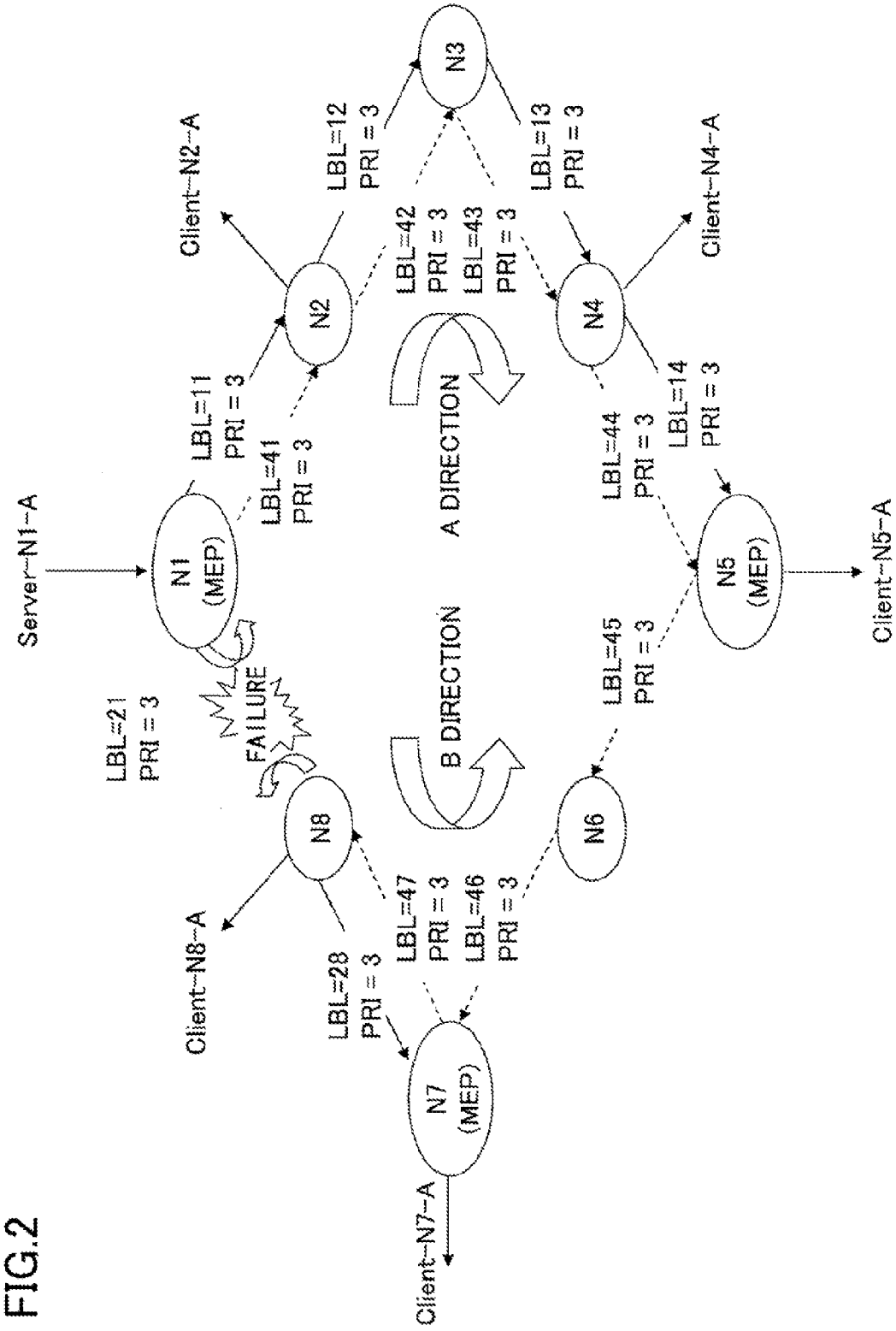
FIG. 2 illustrates an example fault recovery method when a failure occurs.

Further, as illustrated in FIG. 2, for example, when a failure occurs between the node N1 and the node N8 of the working path LSP#WB in the B direction, to relieve (backup) the failure, the packet communicating in the working path LSP#WB is transmitted using the backup path LSP#PA in the A direction. In this case, however, the backup path LSP#PA in the A direction overlaps the working path LSP#WA in the node sections of the nodes N1, N2, N3, N4, and N5. Such an overlapped state in multicast setting may result in unnecessary consumption (use) of the label values and bandwidth because the same data packets may communicate (transmit) in the above overlapped node sections using different label values.

In the following, an embodiment is described with reference to the accompanying drawings.

Configuration of Ring Network

Figure 3:
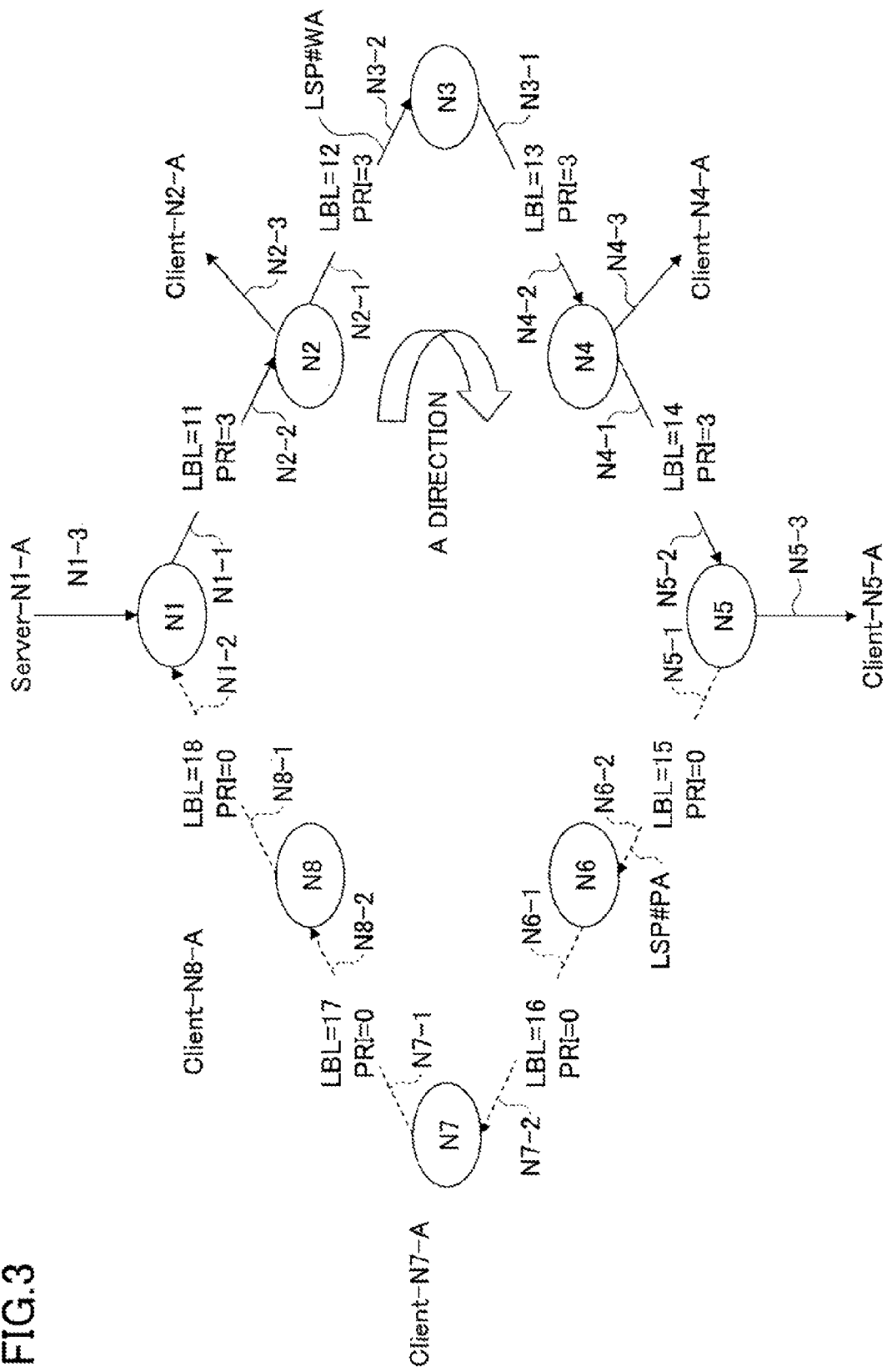
FIG. 3 illustrates an example configuration of the ring network according to an embodiment of the present invention.
Figure 4:
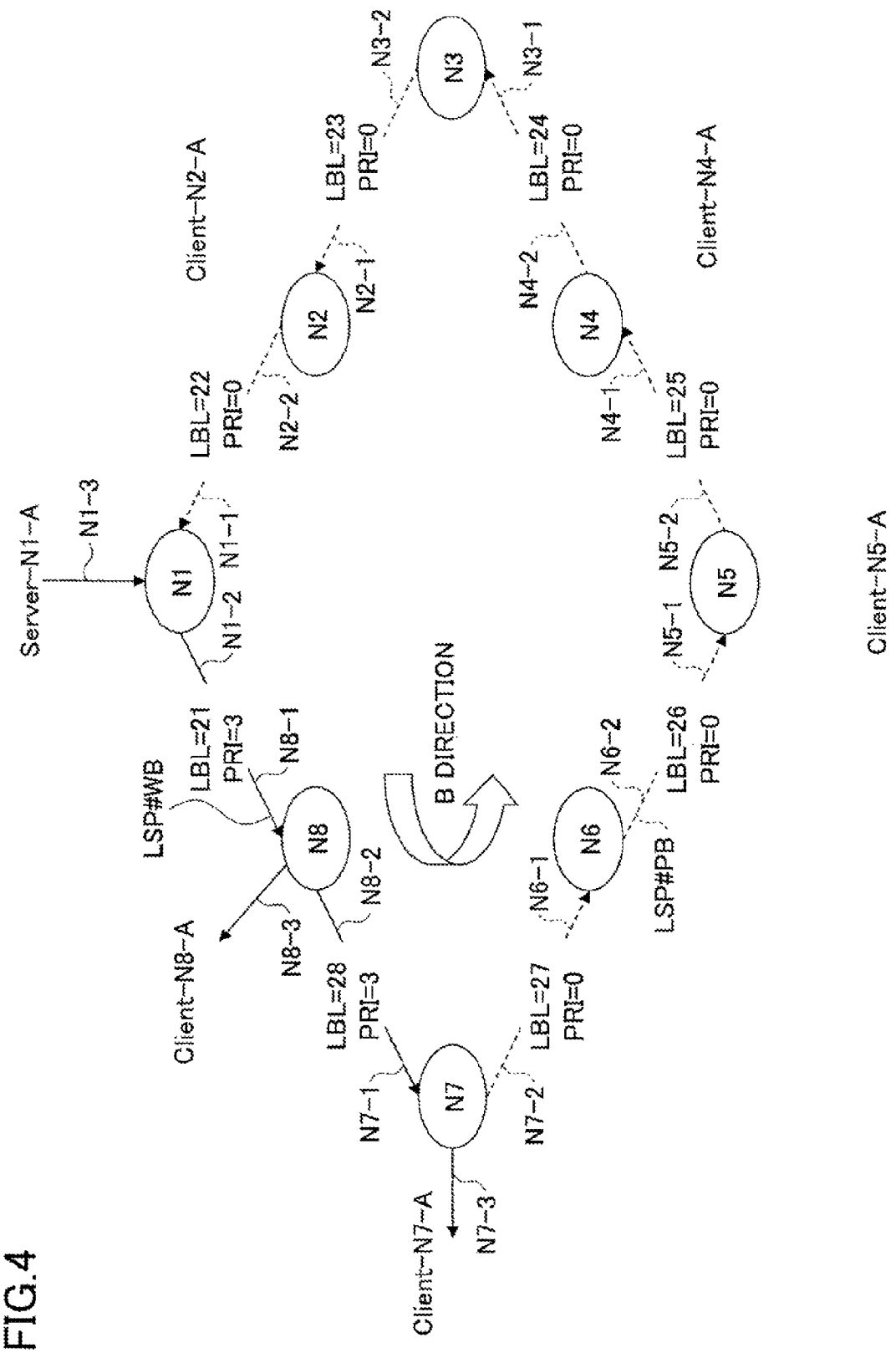
FIG. 4 illustrates another example configuration of the ring network according to the embodiment.

FIGS. 3 and 4 schematically illustrate example configurations of a ring network employing the MPLS-TP scheme performing the multicast communications. Specifically, the ring network of FIG. 3 illustrates an LSP configuration in the multicast communications.

In FIG. 3, the nodes N1 through N8 employing the MPLS-TP scheme are connected in a ring shape to establish a ring network. The lines N1-3, N2-3, N4-3, N5-3 and the like of the nodes denote corresponding client interface lines inputting and outputting data to and from the ring network.

On the other hand, the lines N1-1, N2-1, N3-1, N4-1, N5-1, N6-1, N7-1, and N8-1, and the lines N1-2, N2-2, N3-2, N4-2, N5-2, N6-2, N7-2, and N8-2 denote corresponding network interface lines forming the ring network. The links between nodes have the corresponding values of labels (LBL) and values of priority levels.

In FIG. 3, a working LSP (LSP#WA) is set between the node N1 and the node N5 in an A (clockwise) direction as illustrated as a solid line. The node N1 is the transmission node. The working LSP (LSP#WA) includes the nodes N1, N2, N3, N4, and N5. Also, a backup LSP (LSP#PA) is set from the node N5 to the node N1 in the A (clockwise) direction as illustrated as a dotted line. The backup LSP (LSP#PA) includes the nodes N5, N6, N7, N8, and N1.

By doing this, the working LSP (LSP#WA) from the transmission node N1 to the receiving node N5 which is the terminal point is followed by (directly connected to) the backup LSP (LSP#PA) from the receiving node N5 which is the terminal point to the transmission node N1, so that the working LSP (LSP#WA) and the backup LSP (LSP#PA) are connected to each other to form a ring shape (network).

Further, among the nodes N1 through N8, at least the node which is the transmission node of the working LSP (LSP#WA) includes an OAM packet controller (see FIG. 6) described below.

Further, in the ring network, as illustrated in FIG. 4, a working LSP (LSP#WB) is set between the node N1 and the node N7 in B (counterclockwise) direction as illustrated as a solid line. The working LSP (LSP#WB) includes the nodes N1, N8, and N7. Also, a backup LSP (LSP#PB) is set from the node N7 to the node N1 in the B (counterclockwise) direction as illustrated as a dotted line. The backup LSP (LSP#PB) includes the nodes N7, N6, N5, N4, N3, N2, and N1.

By doing this, the working LSP (LSP#WB) from the transmission node N1 to the receiving node N7 which is the terminal point is followed by (directly connected to) the backup LSP (LSP#PB) from the receiving node N7 which is the terminal point to the transmission node N1, so that the working LSP (LSP#WB) and the backup LSP (LSP#PB) are connected to each other to form a ring shape (network).

In a case where both the working LSP (LSP#WA) and the working LSP (LSP#WB) as illustrated in FIGS. 3 and 4, respectively, are set, a signal input via the line N1-3 is bridged and transmitted (output) to the working LSP (LSP#WA) and the working LSP (LSP#WB) via the lines N1-1 and N1-2, respectively.

Then, the signal is dropped (extracted) from the nodes N2, N4, and N5 of the working LSP (LSP#WA) via the lines N2-3, N4-3, and N5-3, respectively. Also, the signal is dropped (extracted) from the nodes N8 and N7 of the working LSP (LSP#WB) via the lines N8-3 and N7-3, respectively.

In FIGS. 3 and 4, labels (LBL) and priority level (PRI) are indicated for each of the output lines of the nodes in the working LSPs and the backup LSPs.

Hardware Configuration Diagram of Node Device

Figure 5:
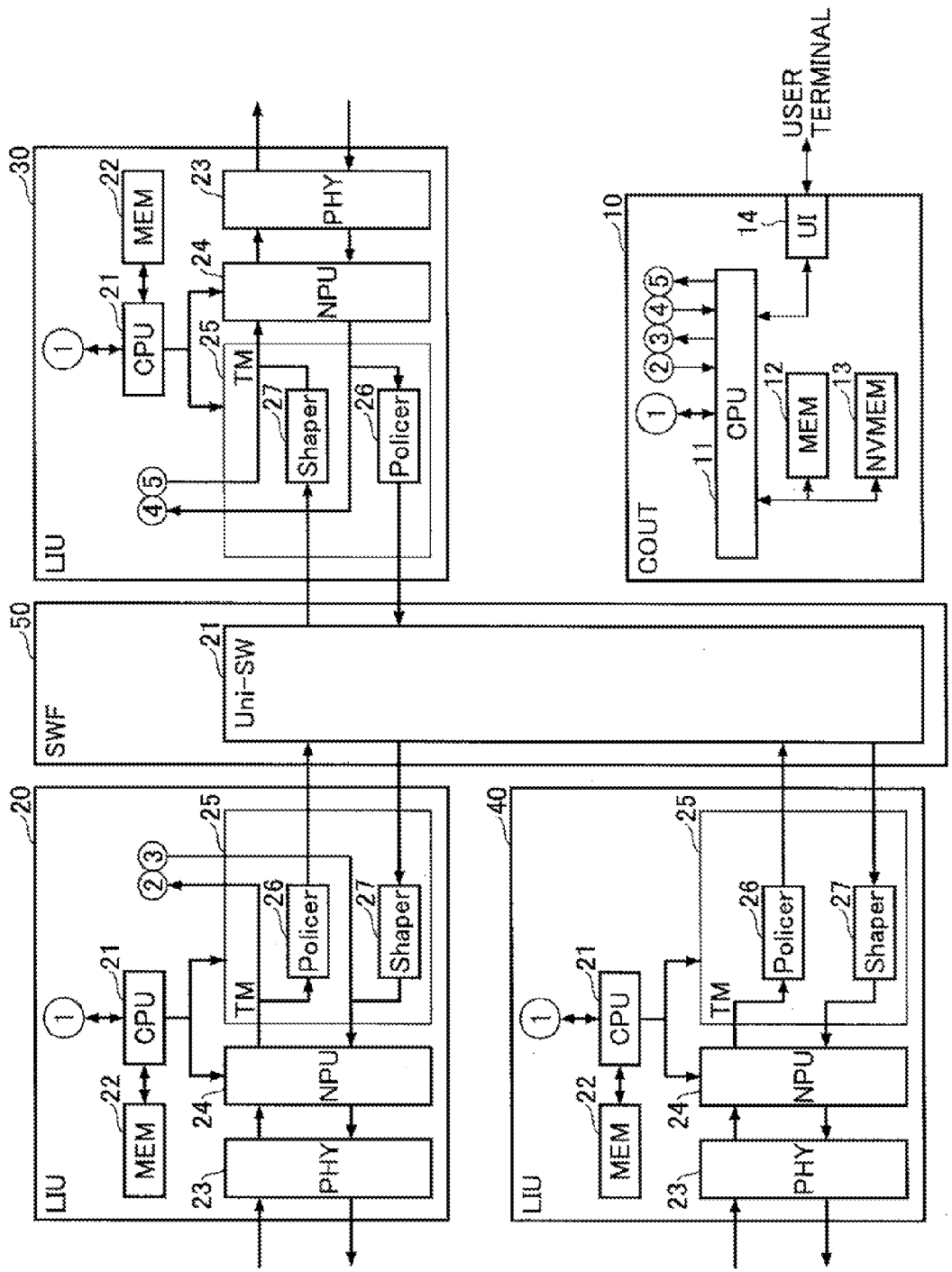
FIG. 5 illustrates an example hardware configuration of a node device according to the embodiment.

FIG. 5 illustrates an example hardware configuration of the node device according to the embodiment. The node device of FIG. 5 corresponds to the nodes N1 through N8 employing the MPLS-TP scheme. As illustrated in FIG. 5, a control unit (CONT) 10 performs setting and control of the entire device, and includes a CPU (Central Processing Unit) 11, a memory (MEM) 12 and a memory (NVMEM) 13. As the memory, the memory MEM 12 refers to a volatile memory (hereinafter "MEM") for processing and the like, and the memory (NVMEM) 13 refers to a non-volatile memory ("NVMEM") for storing setting data and the like.

The CPU 11 executes setting processes and control processes by reading a program from the memories 12 and 13. The control unit (CONT) 10 may further include a user interface ("UI") 14, to which a network monitor controller 62 is connected when a maintenance person performs settings on the node device.

Further, the NVMEM 13 stores LSP management information items which are necessary for, for example, routing. Specifically, the LSP management information items includes an LSP management number, an input LIU number, an input label, an output 1-LIU number, an output 2-LIU number, and an output 2-label.

The control unit (CONT) 10 includes an interface to CPUs of the corresponding link interface units (LIUs) 20, 30, and 40, and reports transmission receiving label control information items to the link interface units (LIUs) 20, 30, and 40.

The control unit (CONT) 10 has an OAM packet interface function with the link interface units (LIUs) 20 and 30 and a function of an OAM packet process so as to monitor an OAM packet and generate the OAM packet, and instruct to the link interface units to switch for routing.

The link interface units (LIUs) 20 and 30 serve as network interfaces. On the other hand, the link interface unit (LIU) 40 serves as a client interface. The link interface units (LIUs) 20, 30, and 40 include respective CPUs 21, memories (MEM) 22, physical layer terminators (PHY) 23, NPUs (Network Processing Units) 24 and TMs (Traffic Managements) 25.

The CPU 21 controls to store the transmission receiving label control information items reported from the control unit (CONT) 10 into the volatile memory (MEM) 22, set the transmission receiving label control information items to the NPU 24. Further, the CPU 21 performs policing and shaping settings in a policer 26 and a shaper 27. Further, The CPU 21 controls to change (switch) the routing by updating the LSP management information items based on routing switch instructions from the control unit (CONT) 10.

The physical layer terminator (PHY) 23 is (serves as) a signal interface with a network and a client transmission path. The NPU 24 is a processor and assists the CPU 21.

A receiving-side process of the NPU 24 is to check an LSF#1 label value of a received packet, append a device internal header having information items such as the LSP management number, the input LIU number, the output 1-LIU number, the output 2-LIU number and the like corresponding to the LSF#1 label value, and transmit to the TM 25. Further, in the node including the OAM packet controller, when an LSF#1 label value of an input packet indicates the OAM packet, a value indicating the control unit (CONT) 10 is set to an output LIU number and a signal is transmitted to the TM 25. On the other hand, a transmission-side process of the NPU 24 is to remove the device internal header from the transmission packet received from the TM 25 and the control unit (CONT) 10, the LSF#1 label value is replaced by an output label value based on the LSP management number of the device internal header, and transmits the packet to the to the physical layer terminator (PHY) 23.

A receiving-side process of the TM 25 is to perform policing of a received packet (i.e., limiting the rate of the received packet) and transmit the received packet to a switching fabric (SWF) 50. Further, when the output LIU number of the device internal header is a value indicating the control unit (CONT) 10, the TM 25 transmits the received packet to the control unit (CONT) 10. A transmission-side process of the TM 25 is to perform shaping of a packet (i.e., limiting the rate of the transmission packet) input from the switching fabric (SWF) 50, and transmit the transmission packet to the NPU 24. Further, the TM 25 transmits the OAM packet received from the control unit (CONT) 10 to the NPU 24.

The configuration of the link interface unit (LIU) 40 is similar to that of the link interface units (LIUs) 20 and 30. However, the OAM packet process may not be necessary for the client interface. Therefore, the link interface unit (LIU) 40 may not include the function for the OAM packet process. A receiving-side process of the link interface unit (LIU) 40 is to append an MPLS-TP label header and the device internal header to the received packet and transmit to the TM 25. A transmission-side process of the link interface unit (LIU) 40 is to remove the device internal header and the MPLS-TP label header from the transmission packet received from the TM 25 and transmit to the physical layer terminator (PHY) 23.

Based on the output 1-LIU number/the output 2-LIU number of the device internal header of the input packet, the switching fabric (SWF) 50 transmits the packet to the link interface unit (LIU) on the output side. When an LIU number is set in each of the output 1-LIU number and the output 2-LIU number, the switching fabric (SWF) 50 generates a copy of the input packet so as to transmit the input packet to the link interface units (LIUs) corresponding to both of the LIU numbers.

Functional Block Diagram of Node Device

Figure 6:
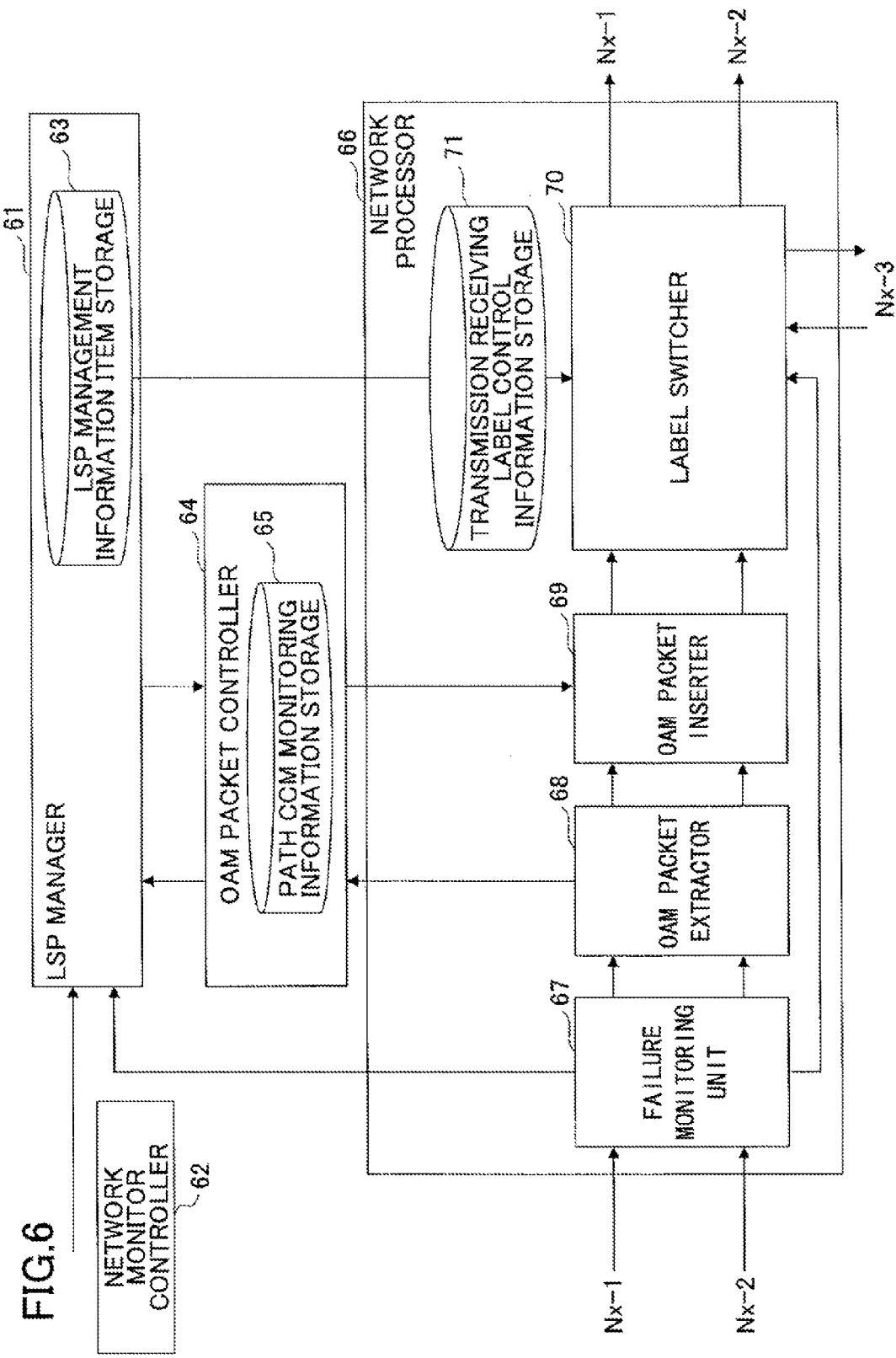
FIG. 6 is an example functional block diagram of the node device according to the embodiment.

FIG. 6 is an example functional block diagram of a node device according to an embodiment. In the configuration of FIG. 6, an LSP manager 61 performs management and control of the LSP. Specifically, the LSP manager 61 controls to store the LSP management information items set by the network monitor controller 62 into an LSP management information item storage 63 per LSP.

An OAM packet controller 64 performs transmission and receiving of the OAM packet and path CCM monitoring. Specifically, the OAM packet controller 64 monitors a path CCM receiving state, and, when determining that a path CCM monitoring timer is time out, updates a monitoring state stored in a path CCM monitoring information storage 65 by setting time out (NG) to the monitoring state, and reports the update to the LSP manager 61. The path CCM monitoring information storage 65 manages the path CCM monitoring timer for each of termination target LSPs of the own node by storing, for example, the monitoring state, a receiving line, and a receiving label of the path CCM monitoring timer.

Further, when the path CCM monitoring timer is time out or when an occurrence or removal of a failure in the receiving line is reported from a failure monitoring unit 67 described below via the LSP manager 61, the OAM packet controller 64 generates a monitor/control packet (LOC-F) to report the occurrence or removal of the failure and supplies the monitor/control packet (LOC-F) to an OAM packet inserter 69. Further, when a monitor control packet (THR-REQ) indicating the switching set/release of the priority level is received (supplied), the OAM packet controller 64 controls to report the reception from the LSP manager 61 to a network processor 66.

The network processor 66 includes functions of the failure monitoring unit 67, an OAM packet extractor 68, an OAM packet inserter 69, a label switcher 70, and a transmission receiving label control information storage 71. The failure monitoring unit 67 monitors occurrence and removal of a failure state (i.e., LOC: Loss of Continuity) in the receiving lines Nx-1 and Nx-2 (x: integers from 1 to 8) and reports the result to the LSP manager 61 and the label switcher 70. The OAM packet extractor 68 extracts the OAM packet from the received signals from the receiving lines Nx-1 and Nx-2 and supplies the OAM packet to the OAM packet controller 64. The OAM packet inserter 69 inserts the OAM packet into signals from the receiving lines Nx-1 and Nx-2, the OAM packet being supplied from the OAM packet controller 64, and supplies the inserted signals to the label switcher 70.

The transmission receiving label control information storage 71 stores the transmission receiving label control information items set by the network monitor controller 62 via the LSP manager 61. The label switcher 70 performs label switching based on the priority level in accordance with the transmission receiving label control information items in the transmission receiving label control information storage 71 in consideration of failure monitoring information from the failure monitoring unit 67. When a signal is to be bridged, the label switcher 70 duplicates the signal and transmits the signal to two directions. Further, the label switcher 70 transmits the OAM packets (i.e., LOC-F and THR-REQ) with the highest priority level "7".

The LSP manager 61 and the OAM packet controller 64 described above are put into practice by the control unit (CONT) 10. The LSP management information item storage 63 and the path CCM monitoring information storage 65 are put into practice by the NVMEM 13 of the control unit (CONT) 10. The LSP management information items may also be stored in the memory (MEM) 22 of the link interface units (LIUs) 20 and 30. The network processor 66 is put into practice by the link interface units (LIUs) 20 and 30 and the switching fabric (SWF) 50.

LSP Management Information Items, Path CCM Monitor Information Items, and Transmission Receiving Label Control Information Items FIG. 7 illustrates the LSP management information items according to an embodiment stored in the LSP management information item storage 63. The LSP management information items are set by the network monitor controller 62. As illustrated in FIG. 7, the LSP management information items include a group ID, a type, a direction, the receiving line (input LIU), a receiving label, a transmission line (output LIU), a transmission label, and a priority level of transmission for each of the nodes. The group ID indicates a pair ring of the paths in A and B directions. As the type, the symbols "A", "T", "D", and "X" denote add (insert), through (succeed), drop (extract), and ring terminal (i.e., transmission source MEP (Maintenance Entry Point) or terminal MEP), respectively. As the direction, the symbols A and B denote the A direction (clockwise direction) and the B direction (counterclockwise direction), respectively. As the priority level, the value zero denotes the lowest priority level and the value seven denote the highest priority level. Further, the value "255" denotes that the priority level on the receiving side is succeeded (i.e., "through").

The LSP management information items in FIG. 7 are described based on the configurations of FIGS. 3 and 4. FIG. 7 illustrates the LSP management information items of the nodes N1 through N8. However, each node may store only the LSP management information items in the LSP management information item storage 63 of the node.

FIG. 8 illustrates the path CCM monitor information items according to an embodiment stored in the path CCM monitoring information storage 65. The path CCM monitor information items are set only in the node which becomes the terminal MEP by the network monitor controller 62. Herein, the MEP refers to a transmission node generating an OAM frame (i.e., the transmission source MEP) and the node at the terminal point of the LSP to terminate the OAM frame (i.e., the terminal MEP). The path CCM monitor information items include a monitoring state, monitoring time, the direction, the receiving line, and the receiving label. The data "OK" of the monitoring state denote that the path CCM monitoring timer is not time out. The data "NG" of the monitoring state denote that the path CCM monitoring timer is time out.

The path CCM monitor information items in FIG. 8 are described based on the configurations of FIGS. 3 and 4. FIG. 8 illustrates the path CCM monitor information items of the nodes N1 through N8. However, the path CCM monitor information items may be stored only in the path CCM monitoring information storage 65 of the nodes which become the MEP.

FIG. 9 illustrates the transmission receiving label control information items according to an embodiment stored in the transmission receiving label control information storage 71. The transmission receiving label control information items includes the items when no failure occurs and items when a failure occurs for each node. The settings (items) when no failure occurs include the line and the label of the receiving source (hereinafter may be referred to as the receiving source line and the receiving source label), the line and the label of the transmission destination, and the priority level (PRI) of the transmission. The settings (items) when a failure occurs which are used when a line failure is detected by the node include the line and the label of the transmission destination and the priority level (PRI). The settings of the line and the label of the receiving source when a failure occurs are the same as those when no failure occurs.

For example, when the line (=N1-2) and the label (=18) of the receiving source of the node N1 when no failure occurs are considered, the node N1 is the node that "adds" a signal; therefore, the packets received from the line (=N1-2) other than the OAM packet are discarded (destroyed). Further, in node 8, the line (=N8-1), the label (=21), and the priority level (=3) of the transmission destination settings when a failure occurs are set in response to the line (=N8-2) and the label (=17) of the receiving source settings and the line (=N8-1), the label (=18), and the priority level (=255, i.e., succeed) of the transmission destination settings when no failure occurs. The values of the line and the label of the transmission destination settings when a failure occurs are the same as the values of the line (N1-2), the label (=21), and the priority level (=3) of the transmission destination settings of the line (=N1-3) of the receiving source.

Figure 10:
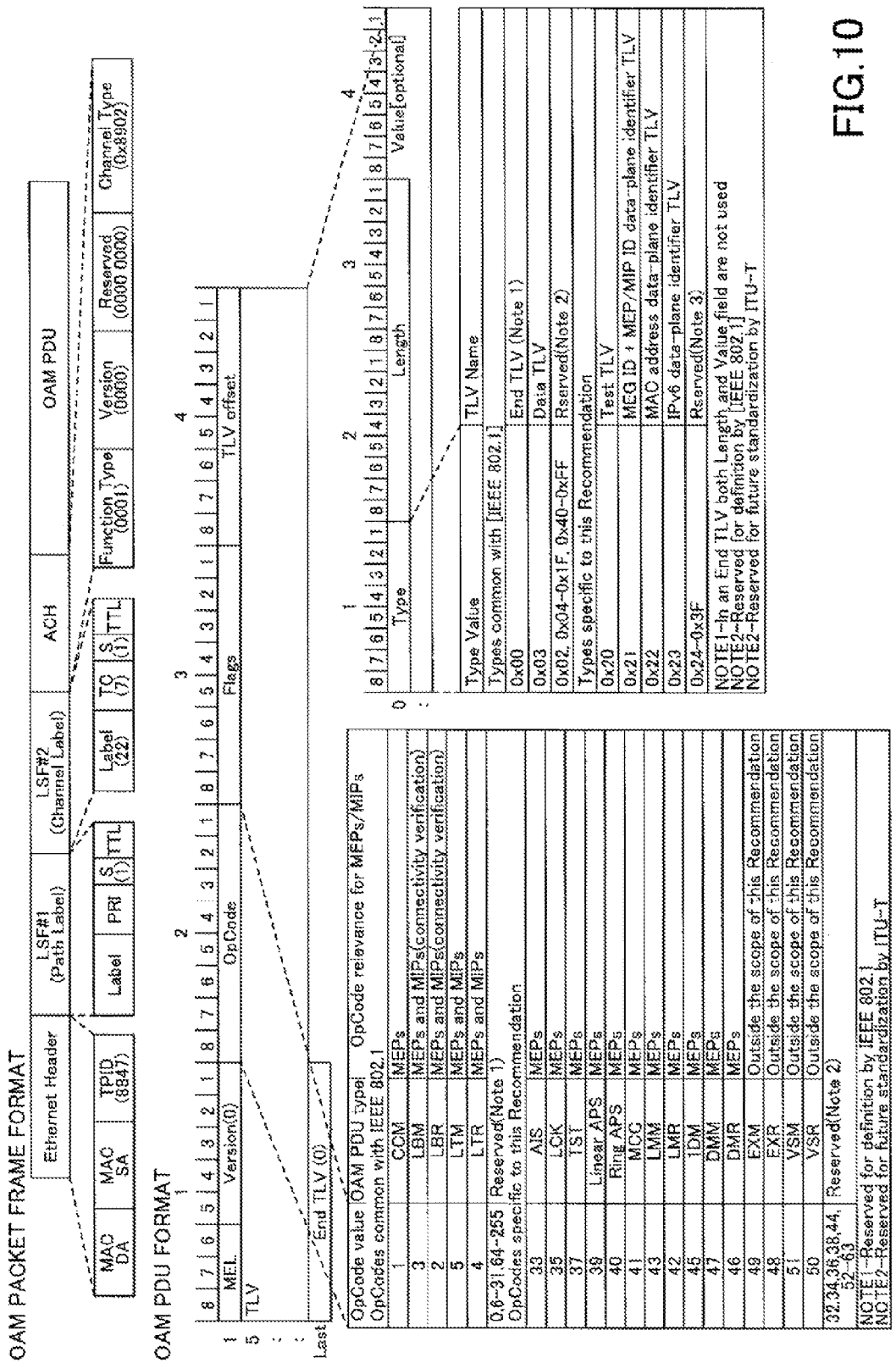
FIG. 10 illustrates an example frame format of an MPLS-TP path OAM packet.

FIG. 10 illustrates an example frame format of the MPLS-TP path OAM packet. The frame format includes fields (items) including a destination address (Destination MAC Address), a transmission source address (Source MAC Address), and a TPID (Type ID), and various information fields including the LSF#1 used for routing, the LSF#2 used to distinguish a signal from the OAM packet, ACH (Associated Channel Header), and OAM PDU (Payload Data Unit). The LSF#1 include the label (LBL), the priority level (PRI), S (Bottom of Stack), and TTL (Time To Live). Here, the values of the priority levels are from zero to seven. The greater the value of the priority level, the higher the priority level. The value zero as the priority level is used in the backup LSP when no failure occurs. The values in a range from one to six of the priority level are used in a normal operation. The value seven as the priority level is used in the backup LSP when a failure occurs. Further, the value 255 of the priority level is used to succeed to the priority level on the receiving side in the priority level on the transmission side. Namely, the priority level on the receiving side is also set as the priority level on the transmission side.

The OAM PDU includes MEL (MEG (Maintenance Entity Group) Level) which refers to OAM level information, OAM, OpCode indicating the type of PDU, Flags having a purpose which depends on the type, and TLV offset indicating the initial TLV position in PDU. The OpCode having the value one denotes the CCM. In the OpCode, the values from 34 to 255 are unused. For example, the setting OpCode=64 may be assigned to the LOC-F (failure occurs/no failure), and the setting OpCode=65 may be assigned to the THR-REQ (switching set/release).

FIGS. 11A and 11B illustrate an example TLV format of the LOC-F and the THR-REQ, respectively. In the LOC-F of FIG. 11A, the type is 0x40 (0x: in hexadecimal), and the length is 0x01. Further, as the direction, the values of 0x01 and 0x02 represent the A and the B directions, respectively. As the LOC-F, the values 0x01 and 0x02 denote no failure (failure is backup) and under failure (i.e., when a failure occurs).

In the THR-REQ of FIG. 11B, the type is 0x41, and the length is 0x01. Further, as the direction, the values of 0x01 and 0x02 represent the A and the B directions, respectively. As the THR-REQ, the values 0x00 and 0x01 denote the settings of release and switching, respectively. Further, the direction and the value of LOC-F or THR-REQ are set in the Value[optional] of the TLV in FIG. 10.

Failure Detection

In this embodiment, it is assumed that a path in a ring shape is formed as illustrated in FIGS. 3 and 4. In this case, in a solid part used as the working LSP (LSP#WA) and the working LSP (LSP#WB), a packet is transmitted based on the priority level designated (set) when the working paths are set. Further, in a dotted part used as the backup LSP (LSP#PA) and the backup LSP (LSP#PB), a packet is transmitted based on the lowest priority level zero.

The operation in this case is described below. The network monitor controller 62 separately supplies a path setting request and an MEP setting request to the LSP manager 61. The LSP manager 61 sequentially processes the requests from the network monitor controller 62, and stores information in the LSP management information item storage 63.

When the node corresponds to the transmission source MEP, by sending a path CCM transmission request from the LSP manager 61 to the OAM packet controller 64, the OAM packet controller 64 starts periodical transmission of a path CCM packet to the requested path. When the node corresponds to the terminal MEP, by sending a path CCM monitoring request from the LSP manager 61 to the OAM packet controller 64, a receiving monitoring timer of a path CCM message is registered in the path CCM monitoring information storage 65 and a path CCM reception monitoring is started. By doing this, the operational sequence in a normal state illustrated in FIG. 12 is conducted. In this example, a user packet in the working LSP is transmitted with the priority level three, and a user packet in the backup LSP is transmitted with the lower priority level zero.

Figure 13:
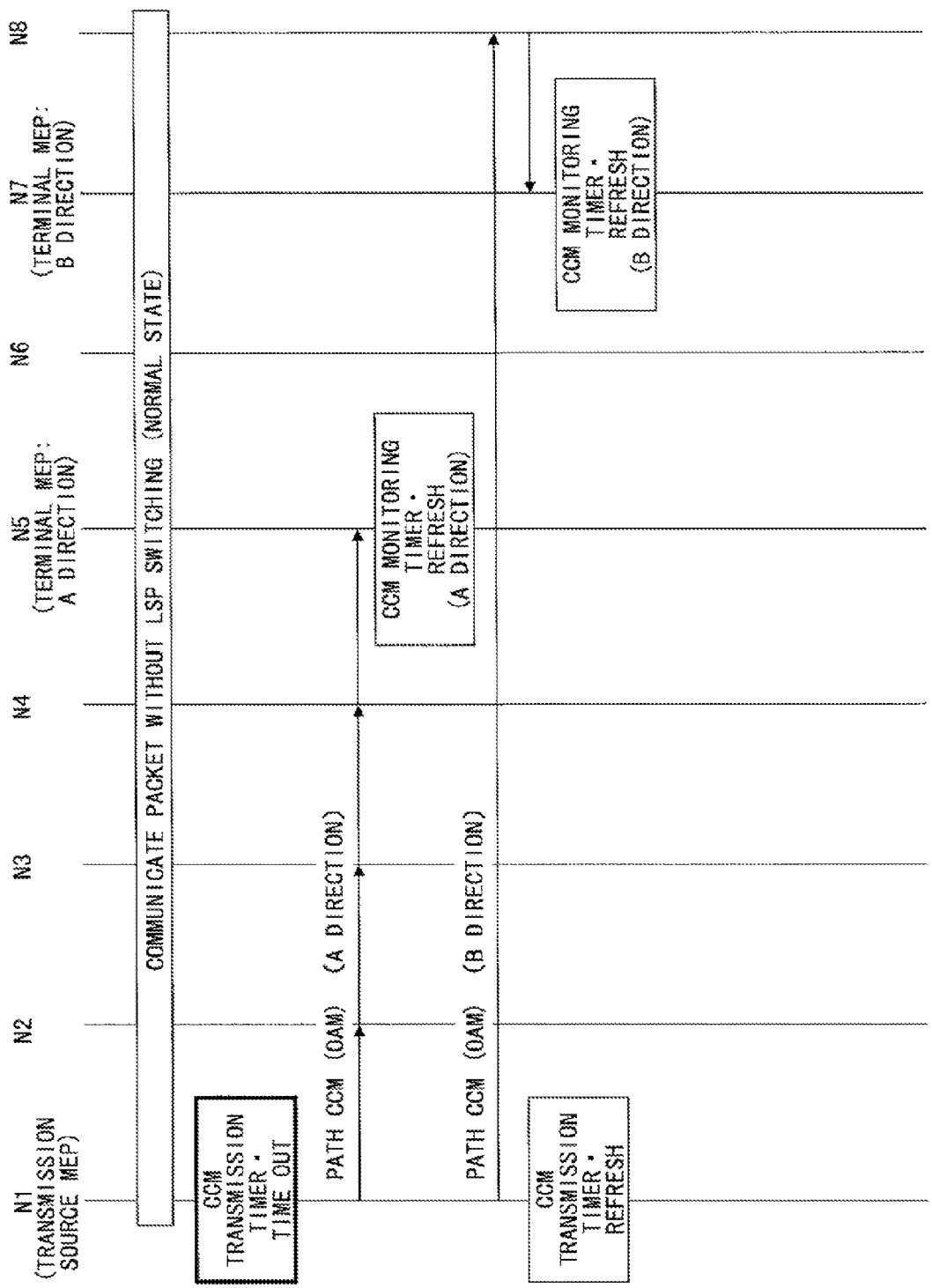
FIG. 13 is a sequence diagram illustrating another example operational sequence in a normal state.

Further, as illustrated in the operational sequence on FIG. 13, the node N1 which is the transmission source MEP periodically transmits the OAM packet of the path CC transmitted to the node N5 which is the terminal MEP in the A direction and the node N7 which is the terminal MEP in the B direction. Upon receiving the path CCM, the OAM packet controller 64 of the nodes N5 and N7 refreshes the CCM monitoring timer. When the path CCM is unable to be received, the CCM monitoring timer is time out, and which is reported to the LSP manager 61.

Operation when Failure Occurs

Here, one terminal MEP that detects the time out of the path CCM monitoring timer transmits the OAM packet to the transmission source MEP via the backup LSP. By doing this, the transmission source MEP transmits the OAM packet of the THR-REQ (switching set/release) to the other terminal MEP.

In the other terminal MEP, when the packet is transmitted from the working path to the backup LSP, since this is the packet transmission for backup (to relieve the failure), the priority level of the transmitted packet is changed from the lowest priority level zero to the highest priority level seven. In the one terminal MEP having detected the failure, when the packet is transmitted from the backup path to the working path, the priority level of the transmission packet is changed from the highest priority level 7 to the priority level of the setting value (original priority level).

Further, when the failure is removed, the original state is restored by returning the values of the priority levels to the original values and performing a switching process.

In the packet priority level control according to this embodiment, when no failure occurs, the packet may transmit in the backup LSP. However, the priority level of the packet is set to the lowest value zero; therefore, basically, the transmission of the packet does not influence the transmission of other packets. When a failure occurs, by changing the priority level of the packet to be transmitted to the backup LSP up to the highest priority level seven, the priority of the backup operation is increased. When the packet transmitted by the backup LSP is transmitted to the working path, the backup is performed by changing the priority level of the packet to the value set in provisioning.

Figure 14:
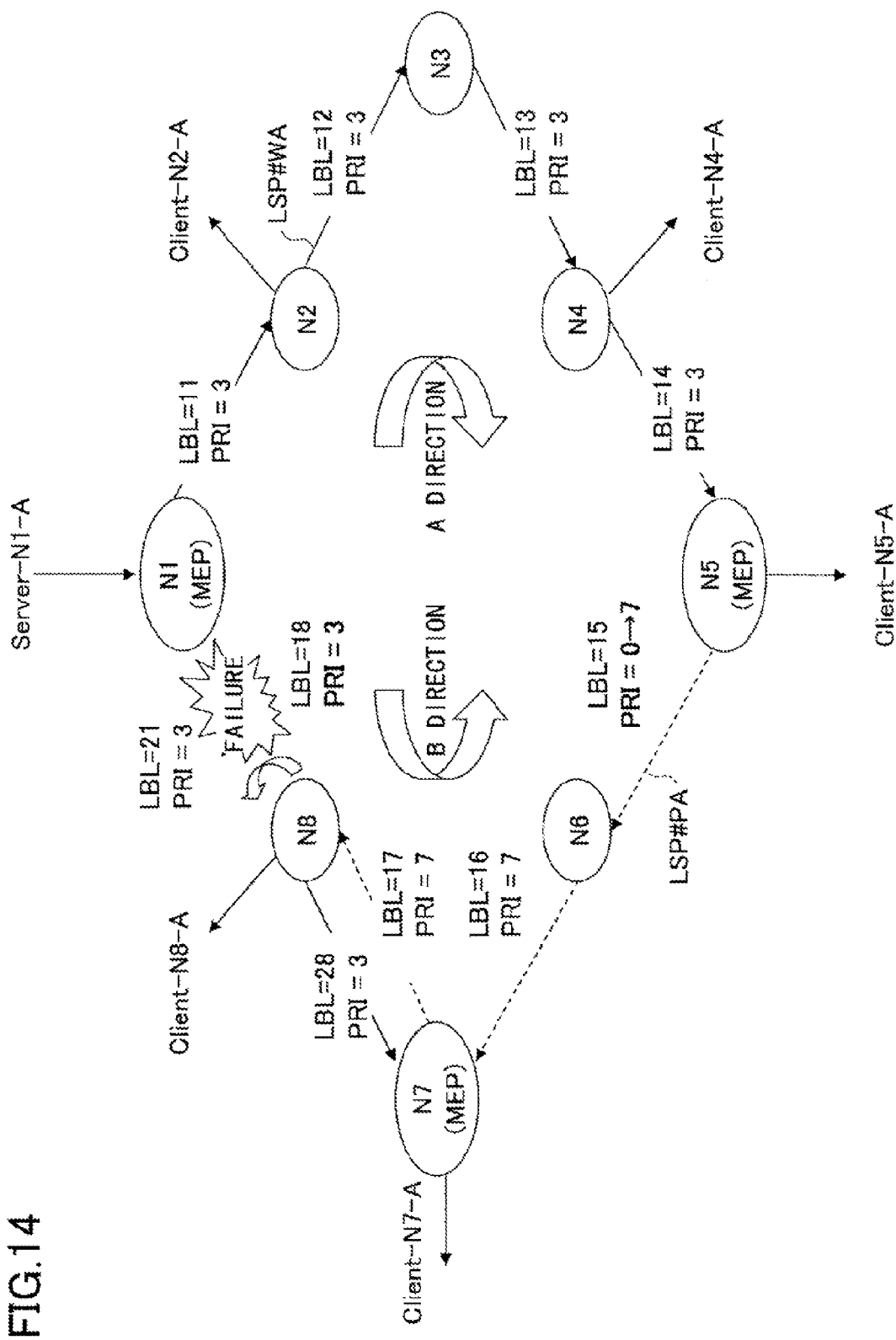
FIG. 14 illustrates an example operation when a line failure occurs.
Figure 15B:
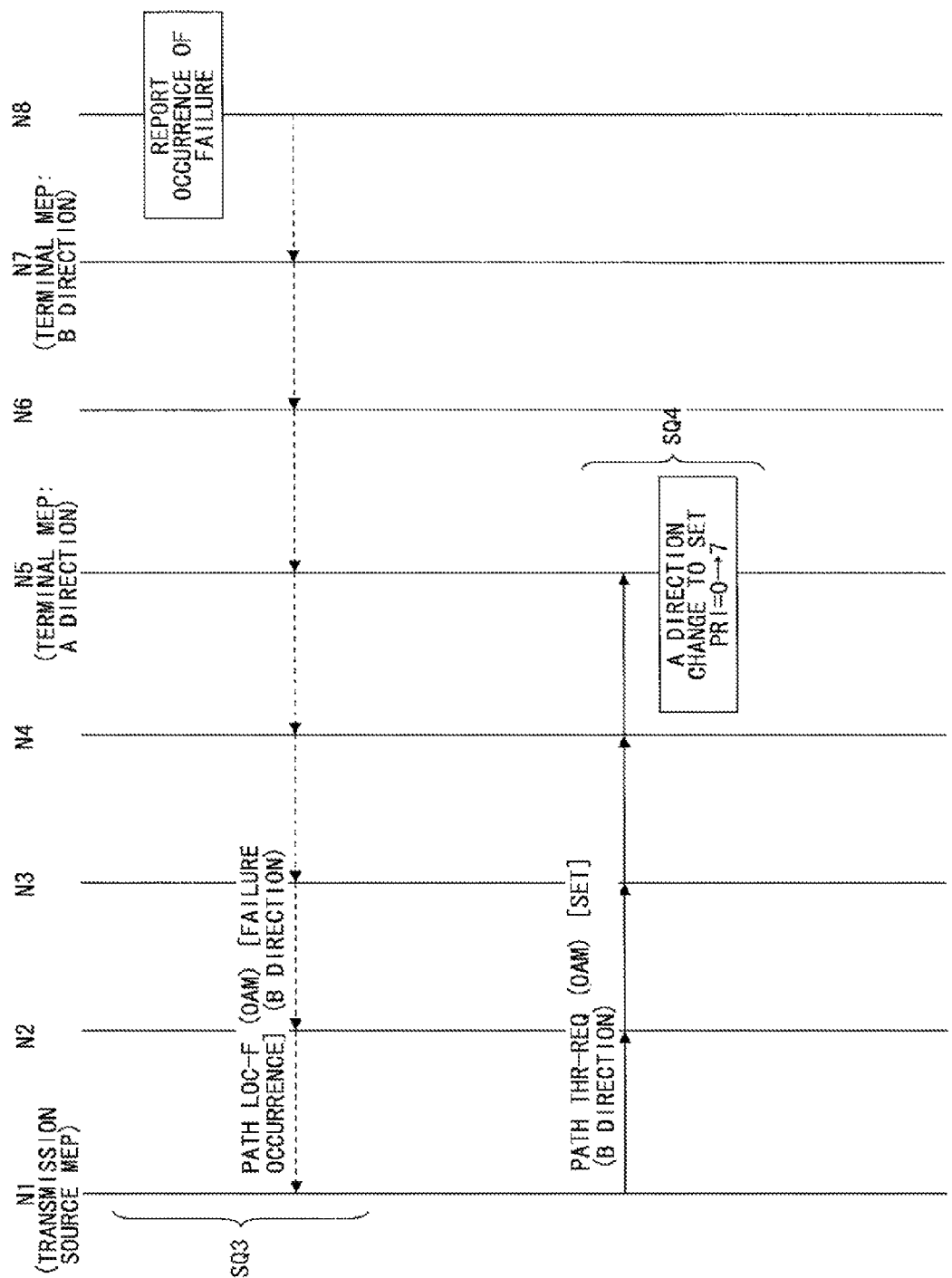

FIG. 14 illustrates a case where a line failure occurs in the link between the node N1 and the node N8. Further, FIGS. 15A and 15B illustrate operational sequence when the line failure occurs.

In FIG. 14, the node N1 which detects the failure is the transmission source MEP. Therefore, no data are set in the transmission destination settings when the failure occurs in the transmission receiving label control information items of FIG. 9, and no switching process is performed (sequence SQ1 in FIG. 15A).

In node N8 which detects the failure, in accordance with the transmission receiving label control information items of FIG. 9, the transmission destination of the backup LSP#PA (LBL=18) is switched to the working LSP#WB (LBL=21), and the setting value of the priority level is changed to three (sequence SQ2 in FIG. 15A). By doing this, before the change, the receiving packet having LBL=17 and PRI=0 is set to the transmission packet having the LBL=18 and PRI=0. On the other hand, after the change, as described below, the packet received with LBL=17 and PRI=7 is transmitted to the line N8-1 with LBL=18 and PRI=3, the packet transmitted with LBL=18 and PRI=3 is received from the line 8-2 with LBL=21 and PRI=3.

Further, the node N8 which detects the failure transmits the OAM packet of LOC-F (failure occurrence) to the node N1 which is the transmission source MEP in a manner that the OAM packet is transmitted to the backup LSP#PB in the B direction. The nodes N7, N6, N5, N4, N3, and N2 which become relay nodes transmit the OAM packet of the received LOC-F (failure occurrence) in accordance with the path setting. The node N1 which is the transmission source MEP receives the OAM packet of the LOC-F (sequence SQ3 in FIG. 15B).

The node N1 acquires the transmission line and the transmission label of the working LSP#WA in the A direction by searching for the receiving line and the receiving label information items of the backup LSP#PB that receives the OAM packet of the LOC-F in the LSP management information items managed by the node N1. By using the acquired transmission label of the working LSP#WA in the A direction, the node N1 transmits the OAM packet of the THR-REQ (switching set) including priority level information to the node N5 which is the terminal MEP in the A direction (i.e., the other terminal MEP). The nodes N2, N3, and N4 transmit the received OAM packet of the THR-REQ based on the path setting. The node N5 which is the terminal MEP in the A direction receives the OAM packet of the THR-REQ.

The node 5 acquires the transmission line and the transmission label of the working LSP#WA in the A direction by searching for the receiving line and the receiving label of the working LSP#WA that receives the OAM packet of the THR-REQ (switching set). The transmission priority levels of the transmission line and the transmission label become change targets. By using the acquired transmission line and the transmission label of the working LSP#WA in the A direction, the LSP manager 61 in the node N5 changes the priority level (PRI) of the target path to the highest value seven in the transmission receiving label control information items (sequence SQ4 in FIG. 15B).

By doing this, the transmission receiving label control information items of the nodes are changed from the data in FIG. 9 to the data in FIG. 16. As a result, the data packet updated in the node N1 is sequentially transmitted in the order of the nodes N2, N3, N4, and N5 in the working LSP#WA in the A direction. After the node N5, the data packet is further transmitted in the order of the nodes N6, N7, and N8 in the backup LSP#PA in the A direction with the priority level seven. Further, from the node N8, the data packet is returned to the node 7 with the original priority level three, and is dropped (extracted) by the node N7.

Figure 17A:
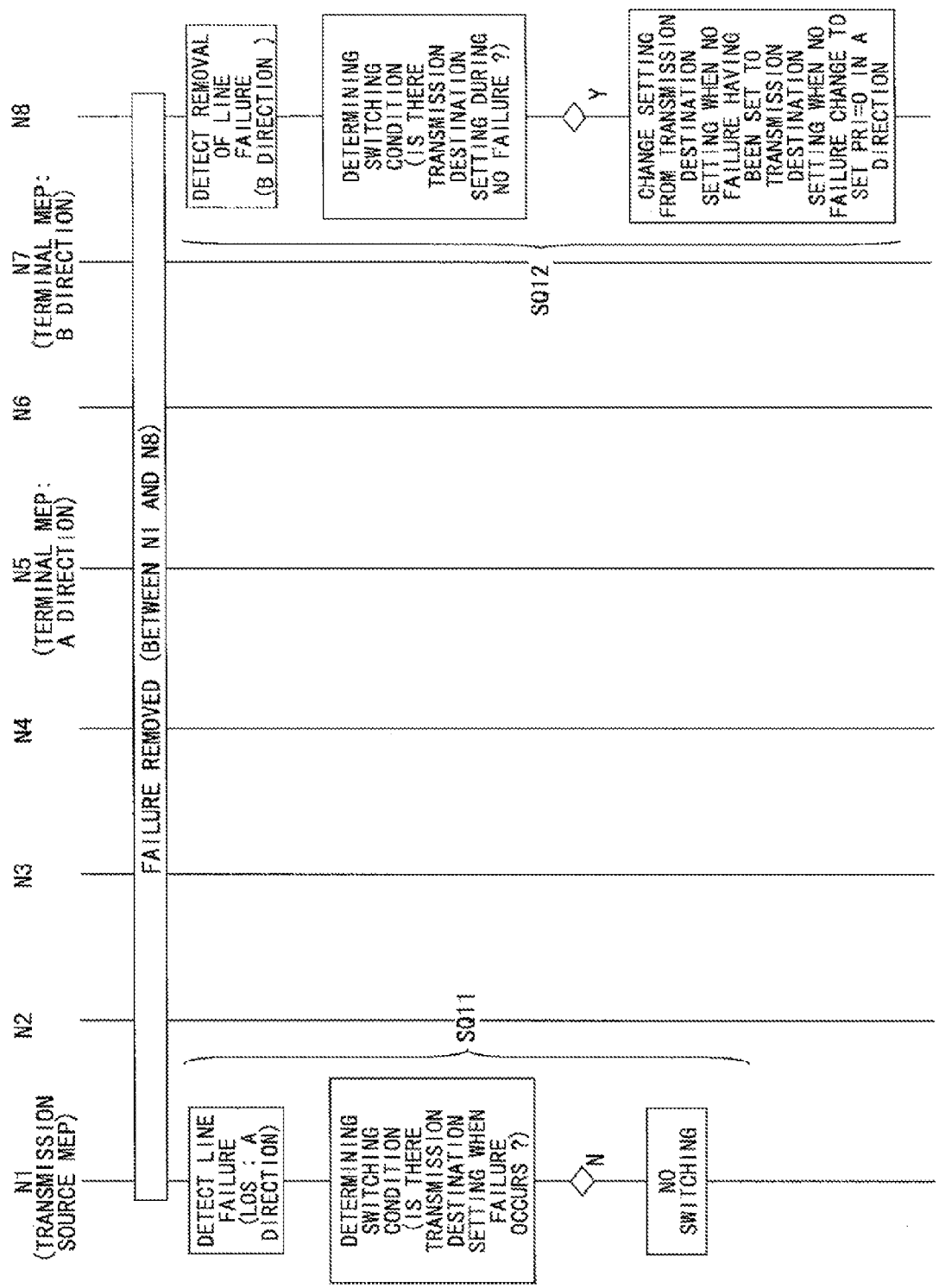
FIGS. 17A and 17B illustrate example operational sequences in the line failure is removed.
Figure 17B:
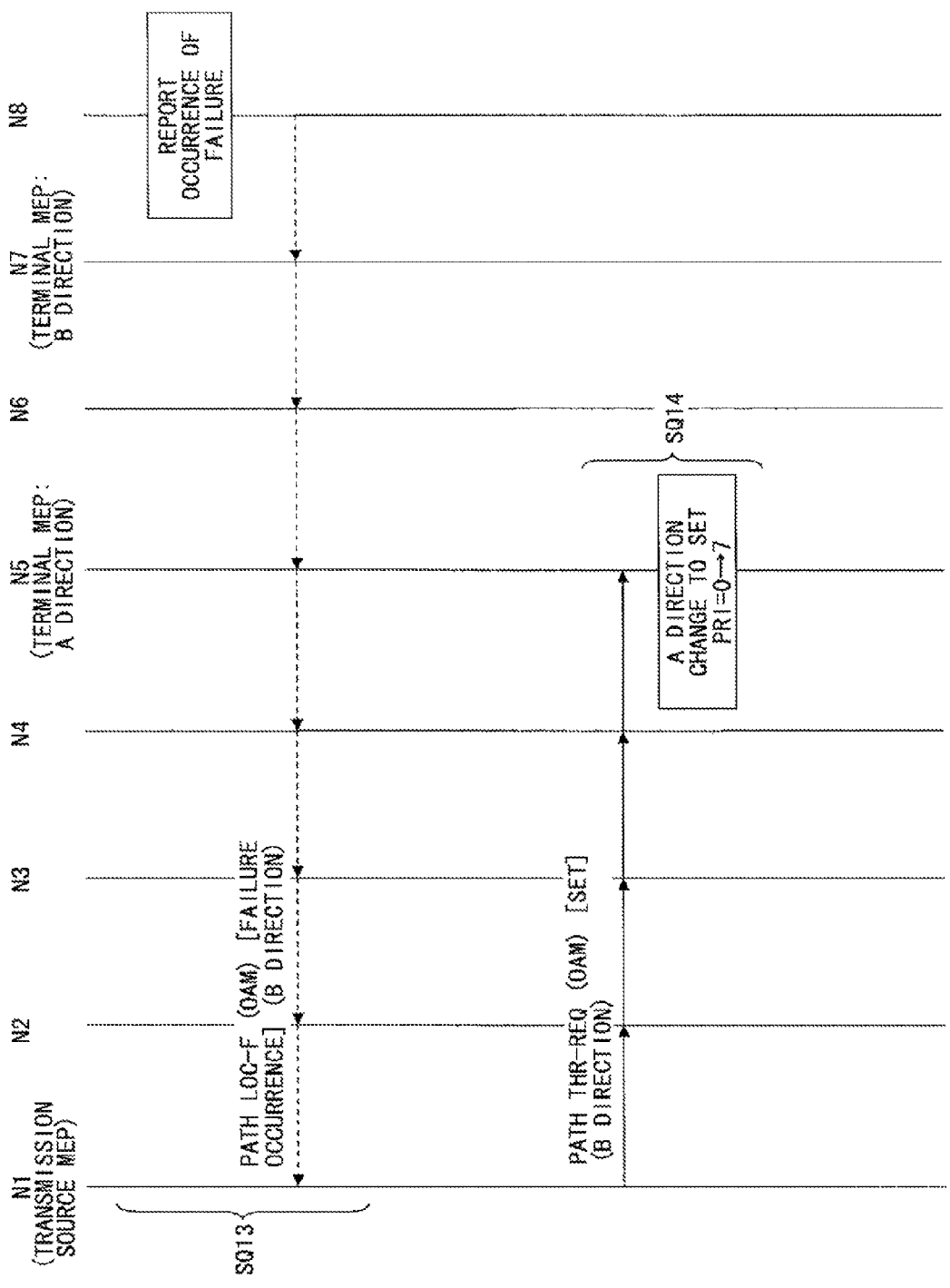

FIGS. 17A and 17B illustrate operational sequence when the failure is removed. When the failure is removed, the node N1 does not perform the switching process because the node N1 is the transmission source MEP (sequence SQ11 in FIG. 17A).

In the node N8 which detects the removal of the line failure, the settings of the transmission receiving label control information items are returned from those set when a failure occurs to those set when no failure occurs, and the priority level (PRI) of the transmission in the backup LSP#PA is also returned to zero (sequence SQ12 in FIG. 17A).

Further, the node N8 which detects the removal of the line failure transmits the OAM packet of LOC-F (no failure) to the node N1 which is the transmission source MEP using the backup LSP#PB in the B direction. The nodes N7, N6, N5, N4, N3, and N2 which become relay nodes in the B direction transmit the received OMA packet of the LOC-F based on the path setting. The node N1 receives the OAM packet of the LOC-F from the node N8 (sequence SQ 13 in FIG. 17B).

The node N1 acquires the transmission line and the transmission label if the working LSP#WA in the A direction by searching for the receiving and the receiving label information items of the backup LSP#PA that receives the OAM packet of the LOC-F in the LSP management information items managed by the node N1. By using the acquired transmission line and the transmission label of the working LSP#PA in the A direction, the node N1 transmits the OAM packet of the THR-REQ (switching release) including the priority level information to the node N5 which is the terminal MEP in the A direction. The nodes N2, N3, and N4 which are relay nodes transmit the OAM packet of the THR-REQ in accordance with the path setting. The node N5 which is the terminal MEP receives the OAM packet of the THR-REQ.

The node N5 acquires the transmission line and the transmission label of the working LSP#WA in the A direction by searching for the receiving line and the receiving label of the working LSP#WA that receives the OAM packet of the THR-REQ in the LSP management information items managed by the node N5. By using the acquired transmission line and the transmission label of the working LSP#WA in the A direction, the LSP manager 61 in the node N5 changes the priority level of the target path in the transmission receiving label control information items to zero (sequence SQ13 in FIG. 17B). By doing this, the transmission receiving label control information items of the nodes are changed from the data in FIG. 16 to the data in FIG. 9.

Flowchart

FIG. 18 is an example flowchart of a process performed by the nodes according to an embodiment. As illustrated in FIG. 18, in step S1, the LSP manager 61 waits for an event from the failure monitoring unit 67 or the OAM packet controller 64. In step S2, it is determined whether a failure change report from the failure monitoring unit 67 is received. When determining that the failure change report is received, the process goes to step S3, where the LSP manager 61 and the OAM packet controller 64 performs a failure change process. Then, the process is returned to step S1.

When determining that no failure change report is received, the process goes to step S4, where it is further determined whether an OAM packet reception report from the OAM packet controller 64 is received. When determining that no OAM packet reception report is received, the process goes back to step S1. When determining that the OAM packet reception report is received, the process goes to step S5, where the OAM packet controller 64 determines the type of the received OAM packet. After that, in step S6, it is determined whether the OAM packet is (corresponds) the LOC-F. When determining that the OAM packet is the LOC-F, the process goes to step S7, where the LSP manager 61 and the OAM packet controller 64 performs an LOC-F receiving process. Then, the process goes back to step S1.

In step S6, when determining that OAM packet is not the LOC-F, the process goes to step S8, where it is further determined whether the OAM packet is the THR-REQ. When determining that the OAM packet is the THR-REQ, the process goes to step S9, where the LSP manager 61 and the OAM packet controller 64 performs a THR-REQ receiving process. Then, the process goes back to step S1. In step S8, when determining that OAM packet is not the THR-REQ, the process goes back to step S1.

Figure 19:
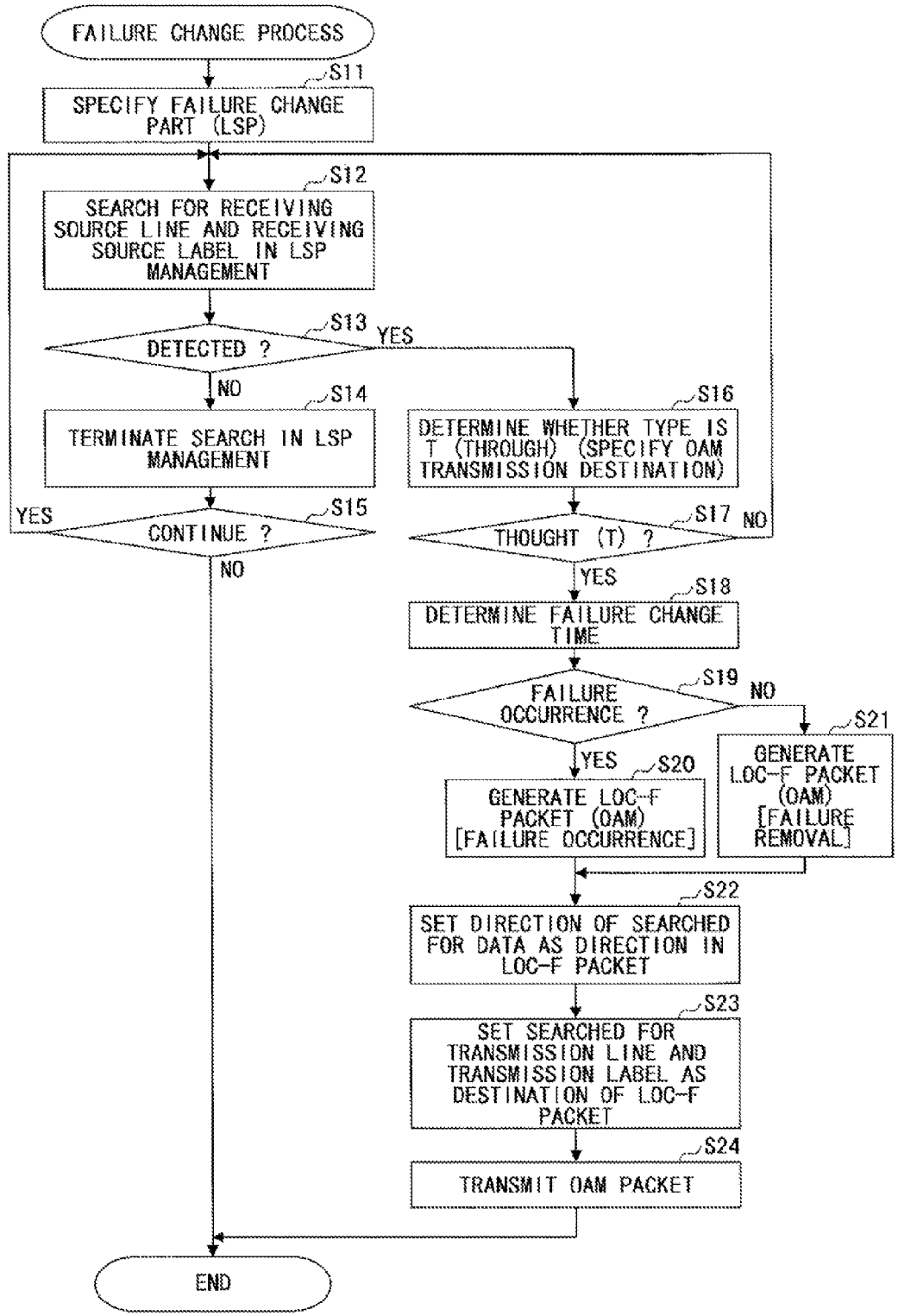
FIG. 19 is an example flowchart of a process according to the embodiment when a failure is changed.

FIG. 19 is an example flowchart of the failure change process performed in step S3 of FIG. 18. As illustrated in FIG. 19, in step S11, the LSP manager 61 specifies the failure change part based on the failure change report from the failure monitoring unit 67. Next, in step S12, by using the receiving source line and the receiving source label of the failure change part, the corresponding receiving source line and the receiving source label are searched for in the LSP management information items in the LSP management information item storage 63. In step S13, it is determined whether the corresponding receiving source line and the receiving source label are detected. When no corresponding data are detected, in step S14, the termination of searching for process in the LSP management information item storage 63 is detected. In step S15, it is determined that the searching for process is to be continued. When determining that the searching for process is to be continued, the process goes to step S12. When determining that the searching for process is to be terminated (i.e., NO in step S15). The process is terminated.

In step S13, when determining that the corresponding receiving source data are detected, the process goes to step S16, where the type of the LSP management information items acquired by the search in step S16 is checked (determined). In step S17, when determining that the type is through (T), the process goes to step S18, where it is determined whether a failure change type is a failure occurrence or a failure removal. In step S17, when determining that the type is other than through (T), the process goes back to step S12. After step S18, in step S19, it is determined whether the failure change type is a failure occurrence. When determining that the failure change type is a failure occurrence, the process goes to step S20, where the OAM packet controller 64 generates the OAM packet of the LOC-F (failure occurrence). When determining that the failure change type is a failure removal, the process goes to step S21, where the OAM packet controller 64 generates the OAM packet of the LOC-F (failure removal).

Next, in step S22, the OAM packet controller 64 sets the direction in the OAM packet of the LOC-F based on the direction of the LSP management information items searched in step S12. In step S23, the OAM packet controller 64 sets the line and the label of the transmission destination settings of the searched LSP management information items in the OAM packet of the LOC-F. Then, in step S24, the OAM packet of the LOC-F is transmitted.

Figure 20:
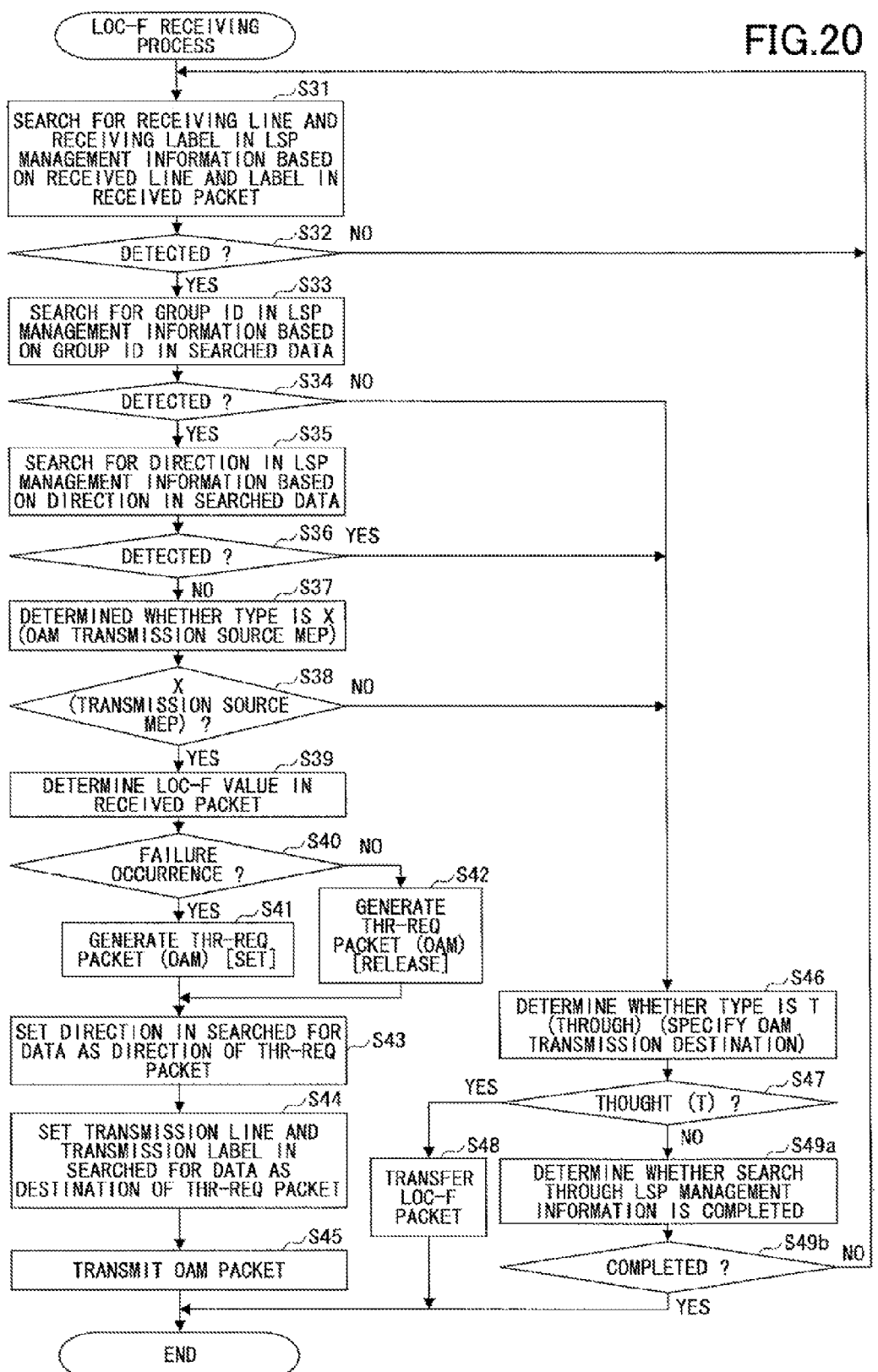
FIG. 20 is an example flowchart of an LOC-F receiving process according to the embodiment.

FIG. 20 is an example flowchart of the LOC-F receiving process according to an embodiment performed in step S7. As illustrated in FIG. 20, in step s31, based on the line through which the OAM packet of the LOC-F is received and the label in the OAM packet, the LSP manager 61 searches the LSP management information items in the LSP management information item storage 63. In step S32, it is determined whether there are the corresponding receiving line and the label. When determining that no corresponding data are detected, the process goes back to step S31. When determining that corresponding data are detected, the process goes to step S33.

In step S33, by using the group ID of the LSP management information items acquired in the search, the LSP management information items in the LSP management information item storage 63 are searched. In step S34, it is determined whether the corresponding group ID is detected. When determining that the corresponding group ID is detected, the process goes to step S35. When determining that no corresponding group ID is detected, the process goes to step S46.

In step S35, by using the direction in the LSP management information items acquired by the search, the LSP management information items in the LSP management information item storage 63 are searched. In step S36, it is determined whether the corresponding direction is detected. When determining that the corresponding direction is detected, the process goes to step S46. When determining that no corresponding direction is detected, the process goes to step S37.

In step S37, it is determined that the type of the LSP management information items acquired by the search is X and transmission source MEP. In step S38, when the type is X (transmission source MEP), the process goes to step S39. When the type is other than X, the process goes to step S46.

In step S39, it is determined whether the LOC-F value of the OAM packet of the LOC-F indicates the failure occurrence (0x02) or the no failure (failure removal) (0x01). In step S40, when the LOC-F value indicates the failure occurrence, the process goes to step S41, where the OAM packet controller 64 generates the OAM packet of the THR-REQ (set (switching set)). When the LOC-F value indicates the failure removal, the process goes to step S42, where the OAM packet controller 64 generates the OAM packet of the THR-REQ (release (switching release)).

Next, in step S43, as the direction in the OAM packet of the THR-REQ, the OAM packet controller 64 sets the direction of the LSP management information items searched in step S35. In step S44, the OAM packet controller 64 sets the line and the label of the transmission destination settings in the searched LSP management information items into the OAM packet of the THR-REQ. Then, in step S45, the OAM packet of the THR-REQ is transmitted.

Further, in step S46, it is determined whether the type of the LSP management information items acquired by the search is through (T). In step S47, when the type is through (T), the process goes to step S48, where the received OAM packet of the LOC-F is transmitted. When the type is other than through (T), the process goes to step S49a.

In step S49a, it is determined whether the search the LSP management information items in the LSP management information item storage 63 is completed. Then, in step S49b, it is further determined whether the search is to be continued or terminated. When determining that the search is to be continued, the process goes back to step S31. When determining that the search is to be terminated, the process is terminated.

Figure 21:
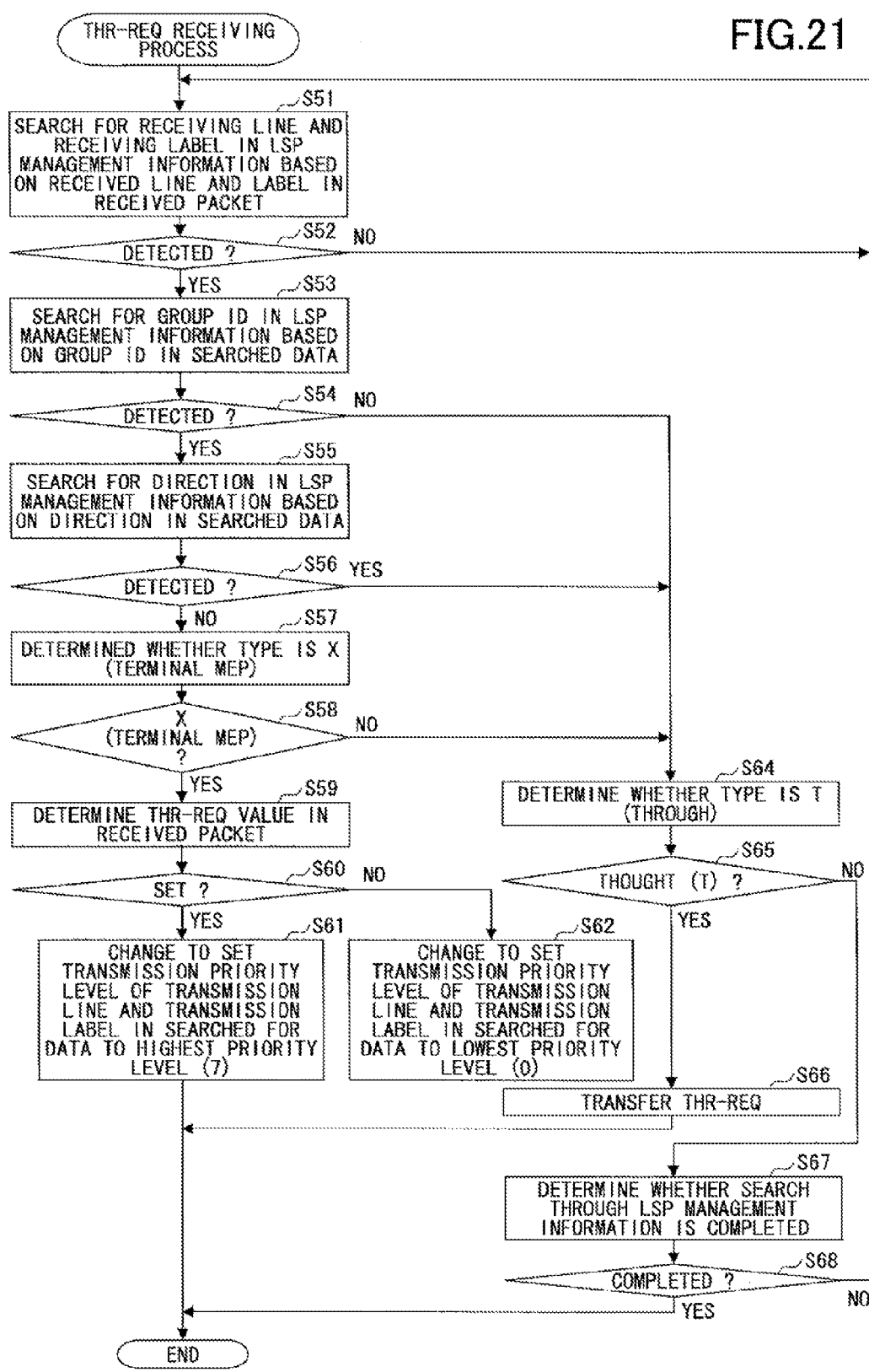
FIG. 21 is an example flowchart of a THR-REQ receiving process according to the embodiment.

FIG. 21 is an example flowchart of the THR-REQ receiving process according to an embodiment performed in step S9. As illustrated in FIG. 21, in step s51, based on the line through which the OAM packet of the THR-REQ is received and the label in the OAM packet, the LSP manager 61 searches the LSP management information items in the LSP management information item storage 63. In step S52, it is determined whether there are the corresponding receiving line and the label. When determining that no corresponding data are detected, the process goes back to step S51. When determining that corresponding data are detected, the process goes back to step S53.

In step S53, by using the group ID of the LSP management information items acquired in the search, the LSP management information items in the LSP management information item storage 63 are searched. In step S54, it is determined whether the corresponding group ID is detected. When determining that the corresponding group ID is detected, the process goes to step S55. When determining that no corresponding group ID is detected, the process goes to step S56.

In step S55, by using the direction in the LSP management information items acquired by the search, the LSP management information items in the LSP management information item storage 63 are searched. In step S56, it is determined whether the corresponding direction is detected. When determining that the corresponding direction is detected, the process goes to step S64. When determining that no corresponding direction is detected, the process goes to step S57.

In step S57, it is determined that the type of the LSP management information items acquired by the search is X and transmission source MEP. In step S58, when the type is X (transmission source MEP), the process goes to step S59. When the type is other than X, the process goes to step S64.

In step S59, it is determined whether the THR-REQ value of the OAM packet of the THR-REQ indicates the setting (switching set) (0x01) or the release (switching release) (0x00). In step S60, when the THR-REQ value indicates the setting (switching set), the process goes to step S61, where the priority level (PRI) of the transmission corresponding to the transmission line and the transmission level of the LSP management information items searched in step S55 is changed to the highest priority level seven. When the THR-REQ value indicates the release (switching release), the process goes to step S46, where the priority level (PRI) of the transmission corresponding to the transmission line and the transmission level of the LSP management information items searched in step S55 is changed to the lowest priority level zero.

Further, in step S64, it is determined whether the type of the LSP management information items acquired by the search is through (T). In step S65, when the type is through (T), the process goes to step S66, where the received OAM packet of the THR-REQ is transmitted. When the type is other than through (T), the process goes to step S67.

In step S67, it is determined whether the search of the LSP management information items in the LSP management information item storage 63 is completed. Then, in step S68, it is further determined whether the search is to be continued or terminated. When determining that the search is to be continued, the process goes back to step S51. When determining that the search is to be terminated, the process is terminated.

Figure 22:
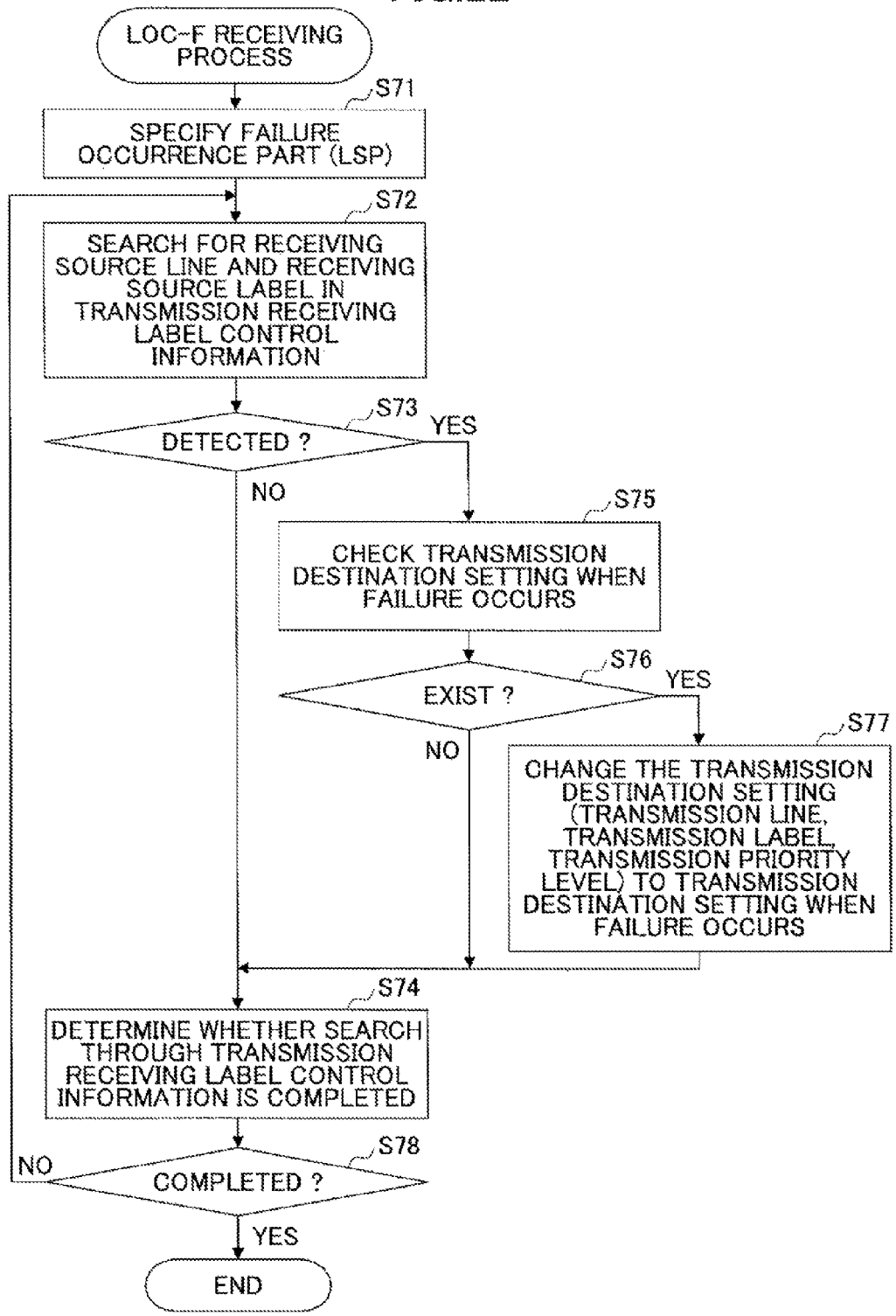
FIG. 22 is an example flowchart of a process when a failure occurs.

FIG. 22 is an example flowchart of a process according to an embodiment performed by the label switcher 70 in each node when a failure occurs. As illustrated in FIG. 22, in step S71, the label switcher 70 specifies a failure occurrence part based on the failure monitoring information from the failure monitoring unit 67. Next, in step S72, by using the receiving line and the receiving label of the failure occurrence part, the receiving source setting information items of the transmission receiving label control information items in the transmission receiving label control information storage 71 are searched. In step S73, it is determined whether the corresponding receiving source setting information items are detected. When detected, the process goes to step S75, and otherwise, the process goes to step S74.

In step S75, the settings of the searched transmission receiving label control information items when a failure occurs are checked (confirmed). In step S76, where determining that there exists the setting of the transmission receiving label control information when a failure occurs, the process goes to step S77, where the transmission destination settings are changed using the line, the label, the priority level registered in the corresponding columns of the transmission receiving label control information when the failure occurs, and the process goes to step S74. When no setting exists of the transmission receiving label control information when a failure occurs in step S76, the process directly goes to step S74.

In step S74, it is determined whether the search of the transmission receiving label control information in the transmission receiving label control information storage 71 is completed. Then, in step S78, it is further determined whether the search is to be continued or terminated. When determining that the search is to be continued, the process goes back to step S72. When determining that the search is to be terminated, the process is terminated.

Figure 23:
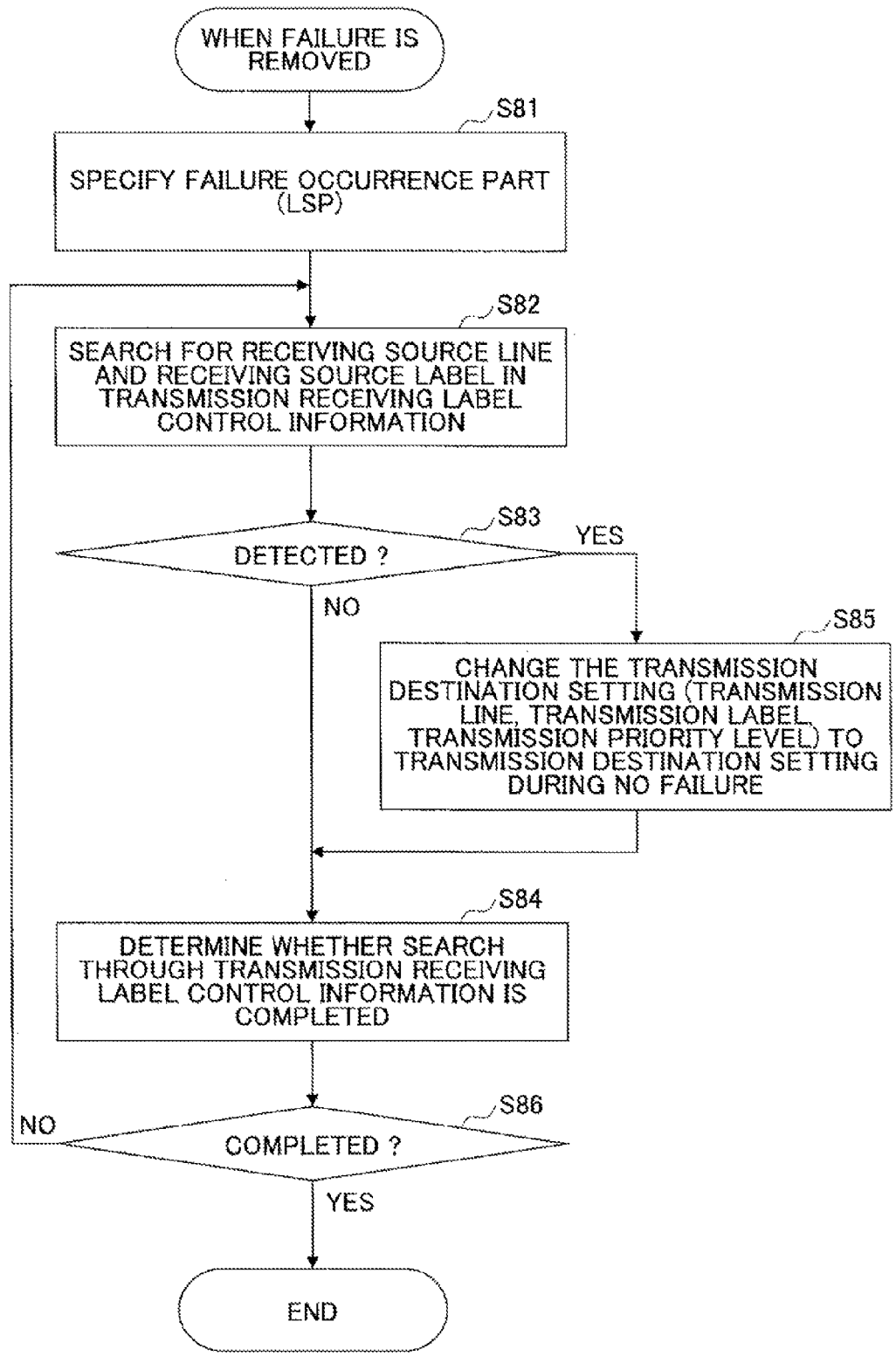
FIG. 23 is an example flowchart of a process in the backup state.

FIG. 23 is an example flowchart of a process according to an embodiment performed by the label switcher 70 in each node when a failure is removed. As illustrated in FIG. 23, in step S81, the label switcher 70 specifies a failure removal part based on the failure monitoring information from the failure monitoring unit 67. Next, in step S82, by using the receiving line and the receiving label of the failure removal part, the receiving source setting information items of the transmission receiving label control information items in the transmission receiving label control information storage 71 are searched. In step S83, it is determined whether the corresponding receiving source setting information items are detected. When detected, the process goes to step S85, otherwise, the process goes to step S84.

In step S85, the transmission destination settings are changed using the line, the label, and the priority level registered in the corresponding columns and the searched transmission receiving label control information items when a failure occurs. Then the process goes to step S84. When there are no settings when the failure occurs, the process directly goes to step S84.

In step S84, it is determined whether the search of the transmission receiving label control information in the transmission receiving label control information storage 71 is completed. Then, in step S86, it is further determined whether the search is to be continued or terminated. When determining that the search is to be continued, the process goes back to step S82. When determining that the search is to be terminated, the process is terminated.

Operations when Another Failure Occurs

Figure 24:
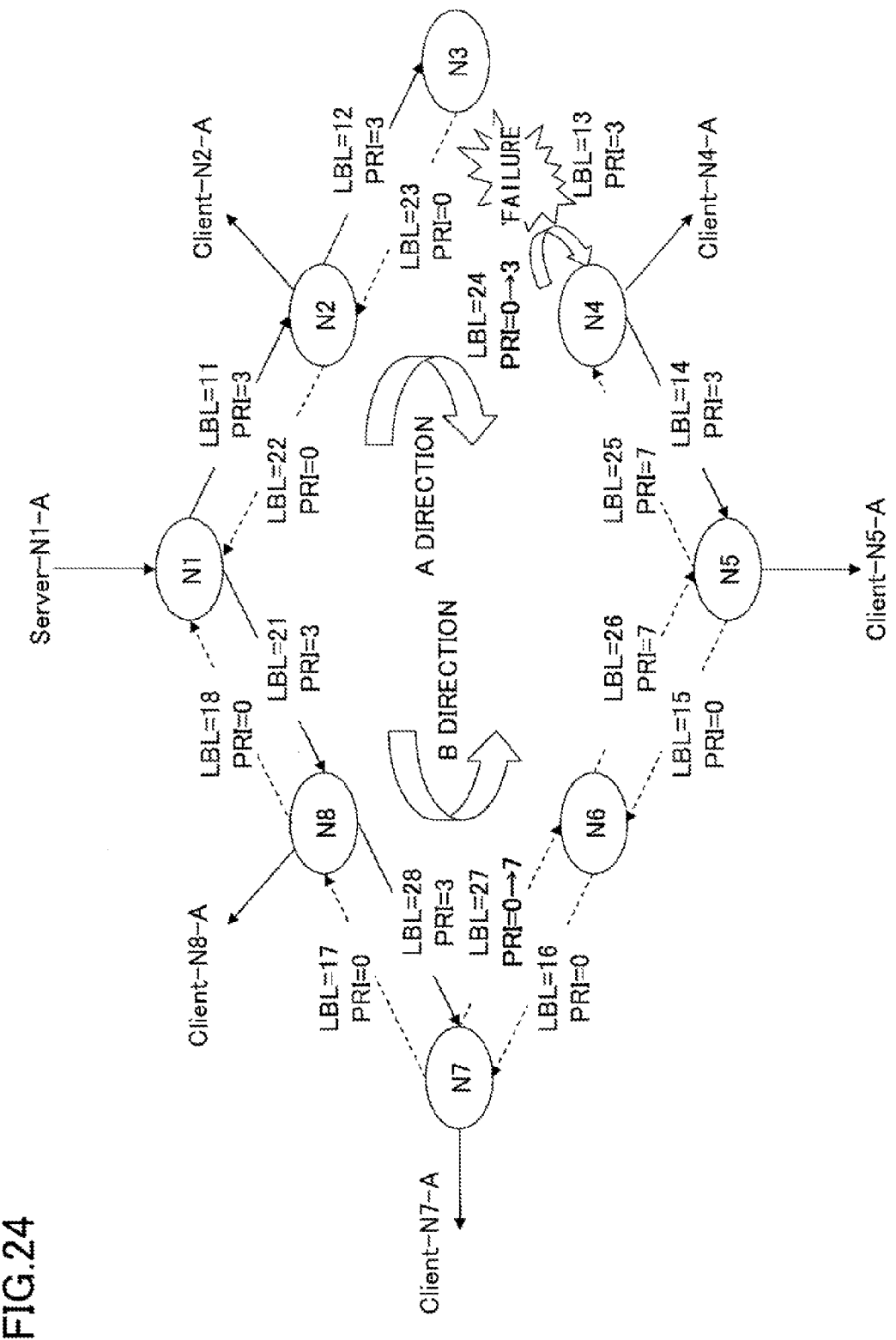
FIG. 24 illustrates an example operation when a line failure occurs.

FIG. 24 illustrates a case where a line failure occurs in the link between the nodes N3 and N4. Further, FIGS. 25A through 25C illustrate an example operational sequence when the line failure occurs.

Figure 25A:
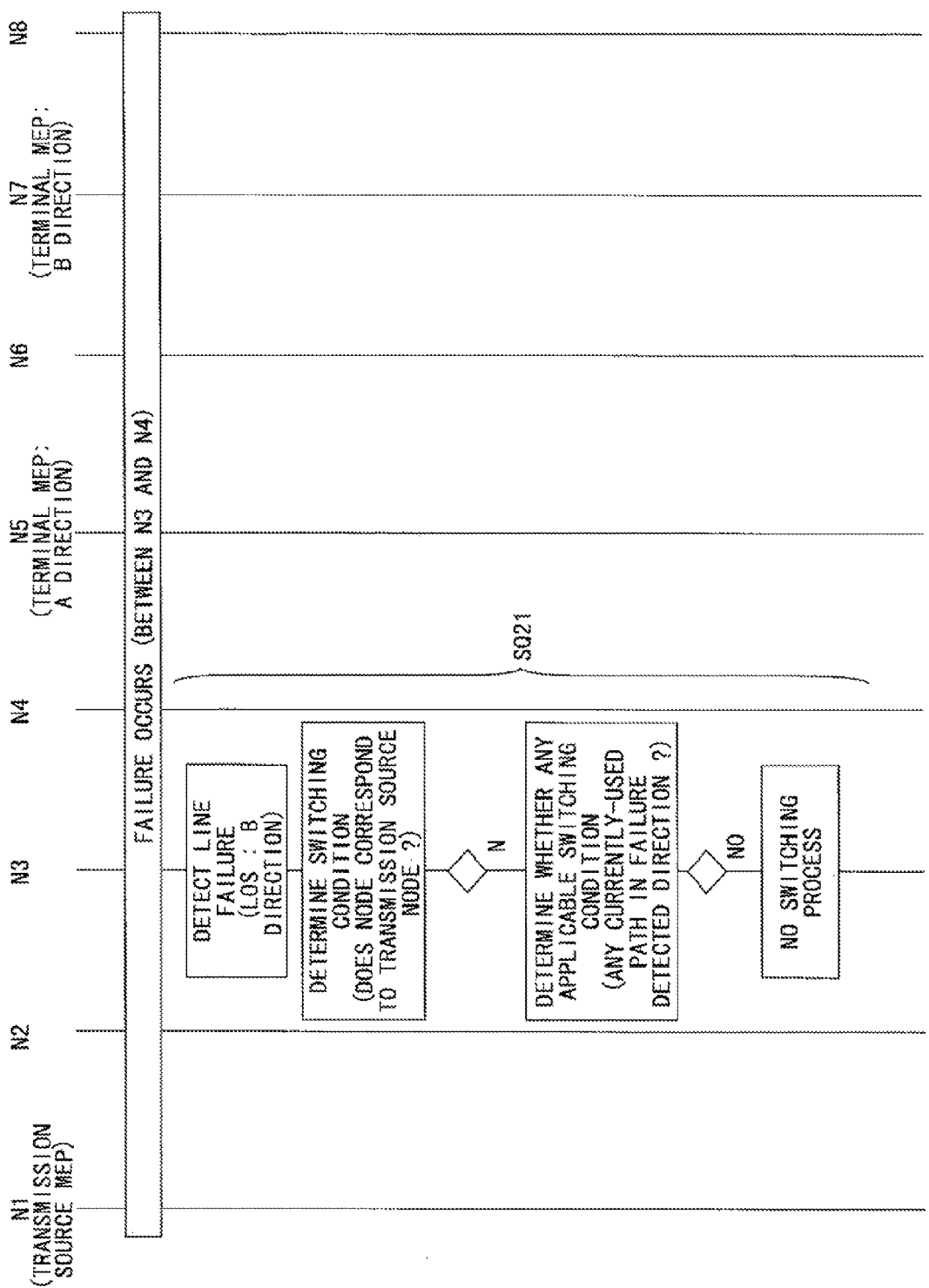
Figure 25B:
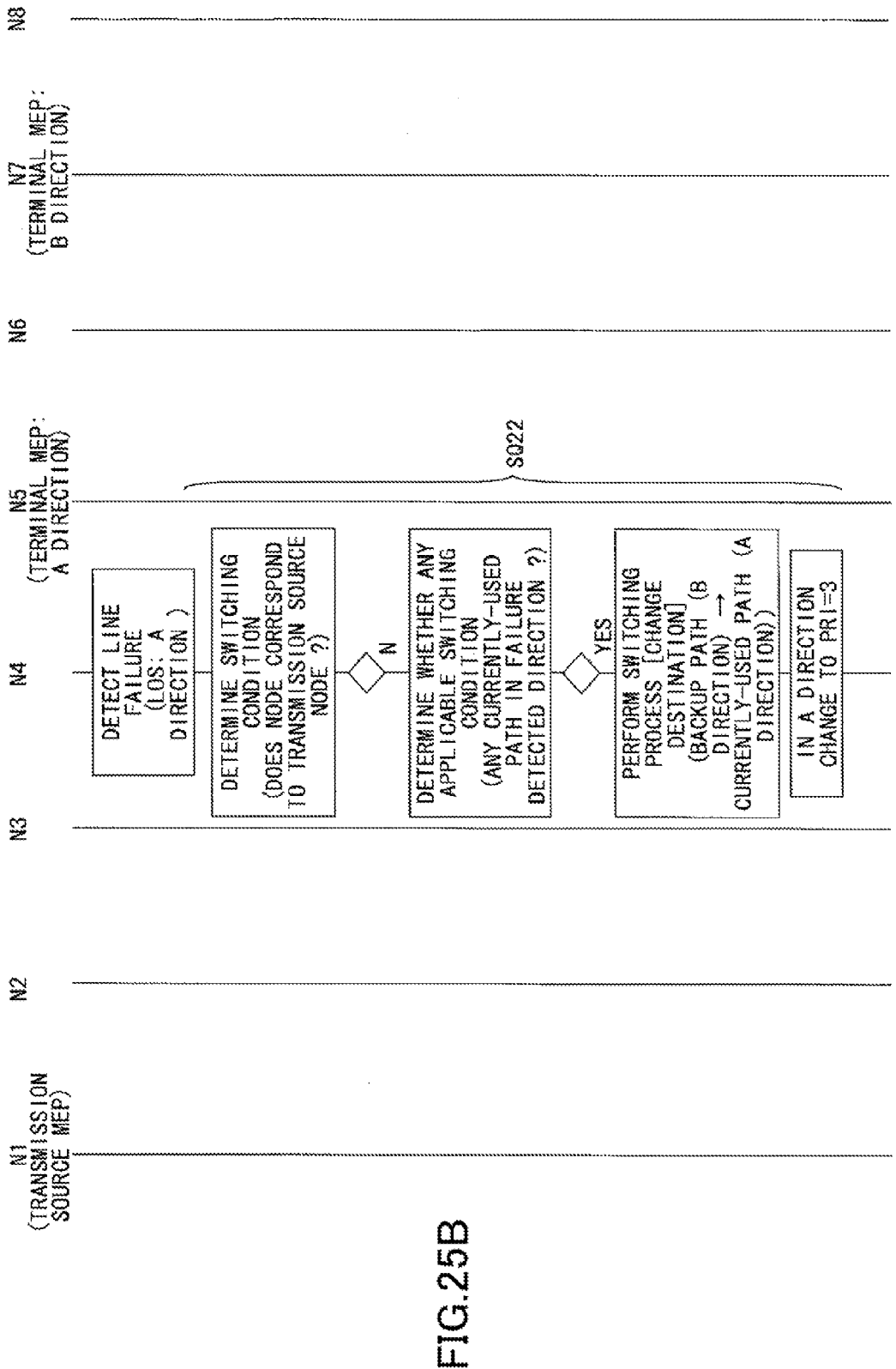

In FIG. 24, in the node N3 which detects the failure, no data of the transmission receiving label control information when a failure occurs in FIG. 9 are set; therefore, the node N3 does not perform the switching process (sequence SQ21 in FIG. 25A).

In the node N4 which detects the failure, the data of the transmission receiving label control information items in FIG. 9 when a failure occurs are set in the transmission destination of the backup LSP#PB (LBL=24). Therefore, based on the settings when the failure occurs, data are changed to the working LSP#WB (LBL=13) in the B direction, and the value of the priority level is changed to three as the setting value (sequence SQ22 in FIG. 25B).

By doing this, before the change, the packet received with LBL=25 and PRI=0 is transmitted as the packet with LBL=24 and PRI=0. On the other hand, after the change, the packet received with LBL=25 and PRI=7 is transmitted as the packet with LBL=13 and PRI=3. Also, the packet transmitted with LBL=13 and PRI=3 is received as the packet with LBL=13 and PRI=3.

The node N5 which is a terminal MEP (one of the terminal MEPs) of the working LSP#WA in the A direction recognizes that a line failure occurs by detecting the time out of the path CCM monitoring timer. The node N5 having detected the line failure transmits the OAM packet of the LOC-F to the node N1 which is the transmission source MEP using the backup LSP#PA. The nodes N6, N7, and N8 which become relay nodes transmit the OAM packet of the LOC-F (failure occurrence) based on the path setting. The node N1 (transmission source MEP) receives the OAM packet of the LOC-F from the node N5 (sequence SQ23 in FIG. 25C).

The node N1 acquires the transmission line and the transmission label of the working LSP#WB in the B direction by searching for the receiving line and receiving label information of the backup LSP#PA that receives the OAM packet of the LOC-F in the LSP management information items managed by the node N1. By using the acquired transmission line and the transmission label of the working LSP#WB in the B direction, the node N1 transmits the OAM packet of the THR-REQ (switching set) including the priority level information to the node N7 which is the terminal MEP in the B direction. The node N8 which is the relay node in the B direction transmits the received OAM packet of the THR-REQ based on the path setting. The node N7 which is the terminal MEP in the B direction receives the OAM packet of the THR-REQ.

The node N7 acquires the transmission line and the transmission label of the of the working LSP#WB in the B direction by searching for the receiving line and the receiving label information of the working LSP#WB that receives the OAM packet of the THR-REQ (switching set) in the LSP management information items managed by the node N7. The transmission line and the transmission priority level of the transmission label are to be changed. Based on the acquired transmission line and the transmission label of the working LSP#WB in the B direction, the LSP manager 61 in the node N7 changes the priority level of the target path in the transmission receiving label control information items to seven (sequence SQ24 in FIG. 25C).

As a result, the data packet added by the node N1 is sequentially transmitted in the order of the nodes N8 and N7 using the working LSP#WB in the B direction. From the node N7, the data packet is further sequentially transmitted in the order of the nodes N6, N5, and N4 in the backup LSP#PB in the B direction with priority level seven. Further, the data packet changes its direction at the node N4 and returned to the node N5 with the original priority level three. Then the data packet is dropped (extracted) at the nodes N4 and N5.

As described above, according to this embodiment, a backup path is formed from the receiving node at the terminal point of the working path to the transmission node, the direction of the backup path being the same as that of the working path. Therefore, when a failure occurs, the working path may not overlap with the backup path in the same direction. As a result, it may become possible to reduce the consumption amount of the label values, and also reduce the necessary bandwidth and avoid excessive use of the bandwidth.

Further, while no failure occurs, the priority level of a packet transmitting in the backup LSP is set to the lowest priority value zero, so as not to influence the transmission of other packets. When a failure occurs, the priority level of a packet transmitting in the backup LSP is set to the highest priority value seven, so that the backup operation may be performed with higher priority.

Further, this embodiment may be applied when the working LSP and the corresponding backup LSP forms a ring shape (loop). Therefore, the embodiment may be applicable to not only a ring-type network, but also, for example, a mesh-type network. This is because when the path setting of the multicast is arranged to be a ring shape by including the path setting of the backup path. By doing this, the same effect as described above may be obtained.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the sprit and scope of the invention.

What is claimed is:

1. A ring network of a multicast label switch path scheme, the ring network comprising:
    a plurality of nodes connected to form a ring and including a transmission node, a first reception node and a second reception node,
    wherein a signal input to the transmission node branches into and is transmitted in first and second different directions to the first and the second reception nodes through first and second working paths, respectively, the first and the second reception nodes defining end points of the first and the second working paths, respectively, from the transmission node,
    the ring network includes a first backup path that extends in the first direction from the first reception node as the end point of the first working path to the transmission node, and a second backup path that extends in the second direction from the second reception node as the end point of the second working path to the transmission node,
    the ring network is arranged so that the first working path and the first backup path extending in the first direction are connected to form a single-path ring and do not overlap each other, and the second working path and the second backup path extending in the second direction are connected to form a single-path ring and do not overlap each other,
    upon receiving data packets from the first and the second working paths, the first and the second reception nodes transmit the data packets to the first and the second backup paths, respectively, by setting a priority level of the data packets to a first value indicating a lower priority level,
    the transmission node includes a control unit configured to periodically insert and transmit a first monitor/control packet in the first and the second working paths to monitor connections, and upon receiving a second monitor/ control packet reporting a failure from the first or the second backup path, insert and transmit a third monitor/control packet in the second or the first working path, the third monitor/control packet instructing the second or the first reception node as the end point of the second or the first working path to change the priority level, and each of the first and the second reception nodes includes a control unit configured to, when no first monitor/control packet is received from the first or the second working path, insert and transmit the second monitor/control packet in the first or the second backup path, and, upon receiving the third monitor/control packet from the first or the second working path, change the priority level of the packet to a second value indicating a higher priority level, so that the packet having been received from the first or the second working path is transmitted to the first or the second backup path with the higher priority level to connect the first or the second working path to the first or the second backup path.

2. A fault recovery method for backing up a ring network of a multicast label switch path scheme in which a signal input to a transmission node branches into and is transmitted in first and second different directions in first and second working paths to first and second reception nodes, respectively, the fault recovery method comprising:

setting first and second working paths that extend in the first and the second directions from the transmission node to the first and the second reception nodes, the first and the second reception nodes defining end points of the first and the second working paths, respectively, the transmission node and the first and the second reception nodes being included in a plurality of nodes in the network, the first and the second directions being different from each other;

setting first and second backup paths that extend in the first and the second directions from the first and the second reception nodes as the end points of the first and the second working paths, respectively, to the transmission node, so that the first working path and the first backup path are connected to form a ring and the second working path and the second backup path are connected to form a ring;

transmitting, by the first and the second reception nodes, a data packet received from the first and the second working paths to the first and the second backup paths, respectively, after setting a priority level of the data packet to a first value indicating a lower priority level;

inserting and transmitting, by the transmission node, a first monitor/control packet in the first and the second working paths on a periodic basis to monitor connections;

inserting and transmitting, by the first and the second reception nodes, when the first or the second reception node does not receive the first monitor/control packet from the first or the second working path, a second monitor/control packet in the first or the second backup path, the second monitor/control packet reporting a failure;

inserting and transmitting, by the transmission node, when the transmission node receives the second monitor/control packet from the first or the second backup path, a third monitor/control packet in the second or the first working path, the third monitor/control packet instructing a change of the priority level;

changing, by the second or the first reception node, when the second or the first reception node receives the third monitor/control packet from the second or the first working path, the priority level of a packet to a second value indicating a higher priority level, the packet being received from the second or the first working path and transmitted to the second or the first backup path; and changing, by a node detecting the failure, a transmission destination of the second or the first backup path to the first or the second working path, wherein the first working path and the first backup path extending in the first direction do not overlap each other and the second working path and the second backup path extending in the second direction do not overlap each other.

3. A node device in a ring network of a multicast label switch path scheme in which a signal input to a transmission node branches into and is transmitted in first and second different directions in first and second working paths to first and second reception nodes, respectively, and the transmission node and the first and the second reception nodes are included in a plurality of nodes in the ring network, wherein the node device is configured to serve as the transmission node, the first and the second working paths extending in the first and the second directions from the transmission node to the first and the second reception nodes, the first and the second reception nodes defining end points of the first and the second working paths, respectively, and the ring network including a first backup path that extends in the first direction from the first reception node as the end point of the first working path to the transmission node, and a second backup path that extends in the second direction from the second reception node as the end point of the second working path to the transmission node, the node device comprising:

a control unit configured to periodically insert and transmit a first monitor/control packet in the first and the second working paths to monitor connections, and upon receiving a second monitor/control packet reporting a failure from the first or the second backup path, the control unit further configured to insert and transmit a third monitor/control packet in the second or the first working path, the third monitor/control packet instructing the second or the first reception node as the end point of the second or the first working path to change the priority level, wherein the ring network is arranged so that the first working path and the first backup path extending in the first direction are connected to form a single-path ring and do not overlap each other, and the second working path and the second backup path extending in the second direction are connected to form a single-path ring and do not overlap each other.

* * * * *